(12) United States Patent
Wang et al.

(10) Patent No.: US 11,159,311 B2
(45) Date of Patent: Oct. 26, 2021

(54) ENCRYPTION KEY MANAGEMENT METHOD AND APPARATUS

(71) Applicant: Huawei International Pte. Ltd., Singapore (SG)

(72) Inventors: Haiguang Wang, Singapore (SG); Xin Kang, Singapore (SG); Zhongding Lei, Singapore (SG); Fei Liu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 57 days.

(21) Appl. No.: 16/688,729

(22) Filed: Nov. 19, 2019

(65) Prior Publication Data

US 2020/0084028 A1 Mar. 12, 2020

Related U.S. Application Data

(63) Continuation of application No. PCT/SG2017/050492, filed on Sep. 29, 2017.

(51) Int. Cl.
*H04L 9/08* (2006.01)
*H04L 29/06* (2006.01)

(52) U.S. Cl.
CPC ........ *H04L 9/0825* (2013.01); *H04L 63/0442* (2013.01); *H04L 63/068* (2013.01)

(58) Field of Classification Search
CPC .. H04L 9/0825; H04L 63/0442; H04L 63/068

(Continued)

(56) References Cited

U.S. PATENT DOCUMENTS 8,347,090 B2 * 1/2013 Holtmanns .............. H04L 9/32
713/168
8,601,263 B1 * 12/2013 Shankar .............. H04L 63/0428
713/166

(Continued)

FOREIGN PATENT DOCUMENTS

| CN | 101739525 B | 2/2012 |
| CN | 104704769 A | 6/2015 |
| WO | 2017060675 A1 | 4/2017 |

OTHER PUBLICATIONS

Zhang et al., "The Key Management of the Encrypted Database Based on XML", IEEE, doi: 10.1109/IIH-MSP.2007.297, 2007, pp. 229-232. (Year: 2007).*

(Continued)

*Primary Examiner* — Peter C Shaw
(74) *Attorney, Agent, or Firm* — Leydig, Voit & Mayer, Ltd.

(57) ABSTRACT

A key management method/apparatus (user equipment) are described. The key management includes encrypting user identity information based on a first public key. The user equipment sends a first user identity message to a first network device. The first user identity message includes the user identity information, an indication identifier that indicates whether the user identity information is encrypted, and a reference identifier for indexing the first public key. The first network device sends, to a second network device, a third user identity message including the user identity information and the reference identifier that indexes the first public key. Thus, when receiving the third user identity message, the second network device can determine the encrypted user identity information, according to a pre-stored mapping table including the first private key.

6 Claims, 18 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 2003/0056096 | A1* | 3/2003 | Albert | H04L 63/108 713/168 |
| 2005/0154887 | A1* | 7/2005 | Birk | G06F 21/41 713/168 |
| 2012/0246463 | A1* | 9/2012 | Shea | H04L 63/0428 713/153 |
| 2013/0290700 | A1* | 10/2013 | Davis | H04L 9/3236 713/153 |
| 2014/0258730 | A1* | 9/2014 | Stecher | H04L 9/0861 713/189 |
| 2015/0271667 | A1 | 9/2015 | Bernsen | |
| 2016/0036786 | A1* | 2/2016 | Gandhi | H04W 12/06 713/168 |
| 2018/0287792 | A1* | 10/2018 | Fu | H04L 9/0822 |

OTHER PUBLICATIONS

Kogiso, "Attack Detection and Prevention for Encrypted Control Systems by Application of Switching-Key Management", IEEE, doi: 10.1109/CDC.2018.8619221, 2018, pp. 5032-5037. (Year: 2018).*

Serpanos et al., "Increasing symmetric key lifetime by controlled randomness", IEEE, doi: 10.1109/ETFA.2005.1612727, 2005, pp. 6 pp. -580. (Year: 2005).*

"3rd Generation Partnership Project; Technical Specification Group Services and System Aspects; Security Architecture and Procedures for 5G System (Release 15)," 3GPP TS 33.501 V0.3.0, pp. 1-44, 3rd Generation Partnership Project, Valbonne, France (Aug. 2017).

"Skeleton Proposal for Privacy Related Sub-clauses," 3GPP TSG SA WG3 (Security) Meeting #88, Dali, China, S3-171777, pp. 1-4, 3rd Generation Partnership Project, Valbonne, France (Aug. 7-11, 2017).

"3rd Generation Partnership Project; Technical Specification Group Services and System Aspects; Study on the security aspects of the next generation system (Release 14)," 3GPP TR 33.899 V1.3.0, pp. 1-605, 3rd Generation Partnership Project, Valbonne, France (Aug. 2017).

"Subscriber Identity Privacy and its Management," 3GPP TSG SA WG3 (Security) Meeting #88, Dali, PR China, S3-171953, pp. 1-3 pages, 3rd Generation Partnership Project, Valbonne, France (Aug. 7-11, 2017).

"3rd Generation Partnership Project; Technical Specification Group Services and System Aspects; Procedures for the 5G System; Stage 2 (Release 15)," 3GPP TS 23.502 V1.2.0, pp. 1-165, 3rd Generation Partnership Project, Valbonne, France (Sep. 2017).

"Rewriting Clause 6.1.2 and 6.1.3 in normative language and adding Annex A," 3GPP TSG SA WG3 (Security) Meeting #88Bis Adhoc, Singapore, S3-172226, 3rd Generation Partnership Project, Valbonne, France (Oct. 9-13, 2017).

* cited by examiner

ENCRYPTION KEY MANAGEMENT METHOD AND APPARATUS

CROSS-REFERENCE TO RELATED APPLICATIONS

This application is a continuation of International Application No. PCT/SG2017/050492, filed on Sep. 29, 2017. The disclosure of the aforementioned application is hereby incorporated by reference in its entirety.

TECHNICAL FIELD

This application relates to the field of communications technologies, and in particular, to a key management method and apparatus.

BACKGROUND

To improve security of user identity information, before the user identity information is sent, the user identity information is usually encrypted by using a public key of a home network, so that the encrypted user identity information is sent.

An existing public key encryption system may include user equipment, an access and mobility management function (AMF) device, an authentication unit function (AUSF) device, and an authentication repository function (ARPF) device. Before sending subscriber permanent identity information (SUPI), the user equipment encrypts the user identity information by using a public key, and sends the encrypted user identity information to the AMF device that stores a private key corresponding to the public key. After receiving the encrypted user identity information, the AMF device sends the encrypted user identity information to the AUSF device, so that the AUSF or another decryption device decrypts the encrypted user identity information by using the private key corresponding to the public key, to obtain the decrypted user identity information, and sends the obtained user identity information to the ARPF device, to perform authentication on the user identity information.

However, in an existing network system, any public-private key pair used for encryption and decryption has a life cycle, and before an end of a life cycle of a public-private key pair, a new public-private key pair requires a distribution process. Therefore, in the existing public key encryption system, at least one set of public-private key pair is allowed to encrypt and decrypt the user identity information. When the at least one set of public-private key pair exists in the public key encryption system, the AUSF device cannot determine a public-private key pair of which a public key is used by the user equipment to encrypt the user identity information, and consequently, cannot determine a public-private key pair of which a private key is used to decrypt the encrypted user identity information, resulting in reduced data decryption efficiency.

SUMMARY

This application relates to a key management method and apparatus, to improve data decryption efficiency.

According to a first aspect, an embodiment of this application provides a key management method, and the key management method may include: encrypting, by user equipment, user identity information based on a first public key; and sending, by the user equipment, a first user identity message to a first network device, where the first user identity message includes the user identity information, an indication identifier used to indicate whether the user identity information is encrypted, and a reference identifier used to index the first public key, so that the first network device processes the first user identity message based on the indication identifier and the reference identifier.

It can be understood that the first public key may be pre-stored, or may be temporarily obtained for using.

It can be understood that a plurality of public keys are stored in the user equipment, and a reference identifier needs to be used to indicate a public key used for encryption. In other words, public keys one-to-one correspond to reference identifiers. For example, if there are 100 public keys, a value range of reference identifiers is 0 to 99. Certainly, a reference identifier may also be a portion intercepted from a public key, or a combination of values on some bits of a public key. For example, if a public key is 50 bits in length, a reference identifier may be a combination of values on the first, second, fourth, eighth, sixteenth, and thirty-second bits.

It should be noted that although the first user identity message includes three parameters, the first user identity message may be represented by two values: The first value is the user identity information, and the second value may indicate the reference identifier, or may indicate the indication identifier.

For example, the indication identifier is 0, indicating that the user identity information is not encrypted, and the reference identifier is also 0 at this moment, indicating that a public key identifier is empty. For example, the indication identifier is a non-zero value (e.g., a value greater than 0), the non-zero value indicates that the user identity information is encrypted, and the non-zero value may indicate an index of the public key used for encryption. For example, if the non-zero value is 100, and is used to indicate that the user identity is encrypted, the public key used for encryption has a reference identifier of 100.

In addition, it should be noted that the first user identity message includes three parameters, and may be represented by three values: The first value is the user identity information, the second value indicates the indication identifier, and the third value may indicate the reference identifier. This is not limited in the present invention.

It can be learned that according to the public key management method provided in this embodiment of this application, the user equipment encrypts the user identity information based on the first public key, and sends, to a second network device by using the first network device, a third user identity message including the encrypted user identity information and the reference identifier that is used to index the first public key, so that when receiving the third user identity message, the second network device can determine, according to a pre-stored mapping table between public-private key pairs and reference identifiers, a first private key corresponding to the first public key, to decrypt the encrypted user identity information by using the first private key, thereby improving data decryption efficiency.

In a possible implementation, before the encrypting, by user equipment, user identity information based on a first public key, the method may further include: determining, by the user equipment, whether to encrypt the user identity information; and when determining not to encrypt the user identity information, sending, by the user equipment, a second user identity message to the first network device, where the second user identity message includes the unencrypted user identity information and the indication identifier.

In a possible implementation, before the encrypting, by user equipment, user identity information based on a first public key, the method may further include: determining, by the user equipment, whether the first public key is in a validity period; and the encrypting, by user equipment, user identity information based on a first public key includes: when the first public key is in the validity period, encrypting, by the user equipment, the user identity information based on the first public key, thereby improving security of the user identity information.

It can be understood that each public key has a corresponding generation date and expiration date, and a current date may be compared with the expiration date, to determine whether the public key is in the validity period.

In a possible implementation, when being 0, the indication identifier indicates that the user identity information is in an unencrypted state.

Optionally, the indication identifier may be represented as a number or as a character string. Different numbers or character strings are used to distinguish whether the user identity information is in an encrypted state. For example, 0 indicates that the user identity information is in the unencrypted state, and 1 indicates that the user identity information is in the encrypted state; and vice versa.

According to a second aspect, an embodiment of this application provides a key management method, and the method may include: receiving, by a first network device, a first user identity message sent by user equipment, where the first user identity message includes user identity information, an indication identifier used to indicate whether the user identity information is encrypted, and a reference identifier used to index a first public key; and if the indication identifier indicates that the user identity information is in an encrypted state, sending, by the first network device, a third user identity message to a second network device based on the reference identifier, where the third user identity message includes the user identity information and the reference identifier, so that the second network device processes the user identity information based on the reference identifier.

It can be learned that after receiving the first user identity message sent by the user equipment, the first network device sends, to the second network device, the third user identity message including the encrypted user identity information and the reference identifier that is used to index the first public key, so that when receiving the third user identity message, the second network device can determine, according to a pre-stored mapping table between public-private key pairs and reference identifiers, a first private key corresponding to the first public key, to decrypt the encrypted user identity information by using the first private key, thereby improving data decryption efficiency.

In a possible implementation, the sending, by the first network device, a third user identity message to a second network device based on the reference identifier may include: sending, by the first network device, the first user identity message to a third network device based on the reference identifier, so that the third network device sends the third user identity message to the second network device when the indication identifier indicates that the user identity information is in the encrypted state.

In a possible implementation, the sending, by the first network device, a third user identity message to a second network device based on the reference identifier may include: determining, by the first network device based on the reference identifier, identification information of the second network device corresponding to the first public key; and sending, by the first network device, the third user identity message to the second network device based on the identification information of the second network device.

In a possible implementation, the method may further include: receiving, by the first network device, a fourth identity message sent by the second network device, where the fourth user identity message includes the decrypted user identity information and the first public key; encrypting, by the first network device, the decrypted user identity information by using the first public key, to generate user identity information that needs to be verified; comparing, by the first network device, the user identity information that needs to be verified and the user identity information; and if the user identity information that needs to be verified is the same as the user identity information, sending, by the first network device, instruction information to the third network device, where the instruction message includes the decrypted user identity information, and the instruction information is used to instruct the third network device to process the decrypted user identity information.

It can be learned that the first network device compares the user identity information that needs to be verified and the encrypted user identity information, to determine, based on a comparing result, whether registration and authentication are to be performed on the user identity information, thereby meeting a requirement of lawful interception for verifying an encrypted identity.

In a possible implementation, the receiving, by the first network device, a fourth user identity information sent by the second network device may include: receiving, by the first network device, the fourth user identity message forwarded by the third network device.

In a possible implementation, before the determining, by the first network device based on the reference identifier, identification information of the second network device corresponding to the first public key, the method may further include: receiving, by the first network device, a mapping table that is between identification information of the second network device and N reference identifiers and that is sent by the second network device, where the N reference identifiers are used to one-to-one correspondingly index N public keys, the first public key is any one of the N public keys, and N is an integer greater than 0; and the determining, by the first network device based on the reference identifier, identification information of the second network device corresponding to the first public key includes: determining, by the first network device according to a mapping table between identification information of the second network device and the N reference identifiers, the identification information of the second network device corresponding to the first public key.

According to a third aspect, an embodiment of this application provides a key management method, and the method may include: receiving, by a second network device, a third user identity message sent by a first network device, where the third user identity message includes user identity information and a reference identifier used to index a first public key; determining, by the second network device based on the reference identifier, a first private key corresponding to the first public key, where the first public key and the first private key are a first public-private key pair; decrypting, by the second network device, the user identity information based on the first private key, to obtain the decrypted user identity information; and sending, by the second network device, the decrypted user identity information to a third network device, so that the third network device processes the decrypted user identity information.

It can be learned that after receiving the third user identity message including the encrypted user identity information and the reference identifier that is used to index the first public key, the second network device may determine, according to a pre-stored mapping table between public-private key pairs and reference identifiers, the first private key corresponding to the first public key, to decrypt the encrypted user identity information by using the first private key, thereby improving data decryption efficiency.

In a possible implementation, the receiving, by a second network device, a third user identity message sent by a first network device may include: receiving, by the second network device, the third user identity message forwarded by the third network device.

In a possible implementation, before the determining, by the second network device based on the reference identifier, a first private key corresponding to the first public key, the method may further include: determining, by the second network device, whether the first public key is in a validity period; and the determining, by the second network device based on the reference identifier, a first private key corresponding to the first public key includes: when the first public key is in the validity period, determining, by the second network device based on the reference identifier, the first private key corresponding to the first public key.

It can be learned that, whether the first public key is in the validity period is determined, and when the first public key is in the validity period, the second network device determines, based on the reference identifier, the first private key corresponding to the first public key, thereby improving the data decryption efficiency.

In a possible implementation, before the receiving, by a second network device, a third user identity message sent by a first network device, the method may further include: obtaining, by the second network device, N public-private key pairs and N reference identifiers, where the N reference identifiers are used to one-to-one correspondingly index the N public-private key pairs, the first public-private key pair is any one of the N public-private key pairs, and N is an integer greater than 0.

In a possible implementation, the obtaining, by the second network device, N public-private key pairs and N reference identifiers may include: generating, by the second network device, the N public-private key pairs; and allocating, by the second network device, reference identifiers to public keys in the N public-private key pairs.

In a possible implementation, the obtaining, by the second network device, N public-private key pairs and N reference identifiers may include: generating, by the second network device, the N public-private key pairs; and sending, by the second network device, a reference identifier request message to a fourth network device, where the reference identifier request message includes public keys in the N public-private key pairs, and the reference identifier request message is used to request the fourth network device to allocate reference identifiers to the public keys in the N public-private key pairs; and receiving, by the second network device, the public keys in the N public-private key pairs and the N reference identifiers that are sent by the fourth network device.

In a possible implementation, the obtaining, by the second network device, N public-private key pairs and N reference identifiers may include: receiving, by the second network device, the N public-private key pairs and the N reference identifiers that are sent by a fourth network device.

In a possible implementation, before the receiving, by a second network device, a third user identity message sent by a first network device, the method may further include: obtaining, by the second network device, the first public key from the N public-private key pairs, and obtaining the reference identifier from the N reference identifiers; and sending, by the second network device, the first public key and the reference identifier to user equipment.

In a possible implementation, after the decrypting, by the second network device, the user identity information based on the first private key, to obtain the decrypted user identity information, the method may further include: sending, by the second network device, a fourth user identity message to the first network device, where the fourth user identity message includes the decrypted user identity information and the first public key, so that the first network device processes the fourth user identity message based on the first public key.

In a possible implementation, the sending, by the second network device, a fourth user identity message to the first network device may include: forwarding, by the second network device, the fourth user identity message to the first network device by using the third network device.

In a possible implementation, the method may further include: when the first public key is not in the validity period, sending, by the second network device, a public key update request message to the user equipment, where the public key update request message is used to instruct the user equipment to update the first public key, to encrypt the user identity information by using a valid public key, thereby improving data security.

In a possible implementation, before the receiving, by a second network device, a third user identity message sent by a first network device, the method may further include: sending, by the second network device, a mapping table between identification information of the second network device and the N reference identifiers to the first network device, where the N reference identifiers are used to one-to-one correspondingly index N public keys, the first public key is any one of the N public keys, and N is an integer greater than 0; and the receiving, by a second network device, a third user identity message sent by a first network device may include: receiving, by the second network device, the third user identity message sent by the first network device according to the mapping table between the identification information of the second network device and the N reference identifiers.

According to a fourth aspect, an embodiment of this application provides a key management method, and the method may include: receiving, by a third network device, a first user identity message sent by a first network device, where the first user identity message includes user identity information, an indication identifier used to indicate whether the user identity information is encrypted, and a reference identifier used to index a first public key; if the indication identifier indicates that the user identity information is in an encrypted state, determining, by the third network device based on the reference identifier, identification information of a second network device corresponding to the reference identifier; and sending, by the third network device, a third user identity message to the second network device based on the identification information of the second network device, where the third user identity message includes the user identity information and the reference identifier that is used to index the first public key, so that the second network device processes the third user identity message based on the reference identifier.

It can be learned that after receiving the first user identity message sent by user equipment, the third network device sends, to the second network device, the third user identity message including the encrypted user identity information and the reference identifier that is used to index the first public key, so that when receiving the third user identity message, the second network device can determine, according to a pre-stored mapping table between public-private key pairs and reference identifiers, a first private key corresponding to the first public key, to decrypt the encrypted user identity information by using the first private key, thereby improving data decryption efficiency.

In a possible implementation, the method further includes: receiving, by the third network device, a fourth user identity message sent by the second network device, where the fourth user identity message includes the decrypted user identity information and the first public key; and sending, by the third network device, the fourth user identity message to the first network device, so that the first network device processes the fourth user identity message based on the first public key.

In a possible implementation, after the sending, by the third network device, the fourth user identity message to the first network device, the method further includes: receiving, by the third network device, instruction information sent by the first network device, where the instruction message includes the decrypted user identity information, and the instruction information is used to instruct the third network device to process the decrypted user identity information.

In a possible implementation, before the determining, by the third network device based on the reference identifier, identification information of a second network device corresponding to the reference identifier, the method may further include: receiving, by the third network device, a mapping table that is between identification information of the second network device and N reference identifiers and that is sent by the second network device, where the N reference identifiers are used to one-to-one correspondingly index N public keys, the first public key is any one of the N public keys, and N is an integer greater than 0; and the determining, by the third network device based on the reference identifier, identification information of a second network device corresponding to the reference identifier includes: determining, by the third network device according to the mapping table between the identification information of the second network device and the N reference identifiers, the identification information of the second network device corresponding to the reference identifier.

In a possible implementation, after the receiving, by the third network device, a mapping table that is between identification information of the second network device and N reference identifiers and that is sent by the second network device, the method may further include: sending, by the third network device, a mapping table between identification information of the third network device and the N reference identifiers to the first network device; and the receiving, by a third network device, a first user identity message sent by a first network device includes: receiving, by the third network device, the first user identity message of the user equipment forwarded by the first network device according to the mapping table between the identification information of the third network device and the N reference identifiers.

According to a fifth aspect, an embodiment of this application provides a key management method, and the method may include: obtaining, by a fourth network device, N public keys, where N is an integer greater than 0; allocating, by the fourth network device, N reference identifiers to the N public keys, where the N reference identifiers are used to one-to-one correspondingly index the N public keys; and sending, by the fourth network device, the N public keys and the N reference identifiers to a second network device, so that the second network device obtains the N public keys and the N reference identifiers.

It can be learned that the fourth network device sends the N public keys and the N reference identifiers to the second network device, so that when receiving a third user identity message, the second network device can determine, based on a reference identifier, a first private key corresponding to a first public key, to decrypt the encrypted user identity information by using the first private key, thereby improving data decryption efficiency.

In a possible implementation, the obtaining, by a fourth network device, N public keys may include: generating, by the fourth network device, N public-private key pairs, where each public-private key pair includes a public key and a private key, and the N public keys are public keys in the N public-private key pairs; and the sending, by the fourth network device, the N public keys and the N reference identifiers to a second network device includes: sending, by the fourth network device, the N public-private key pairs and the N reference identifiers to the second network device.

In a possible implementation, the obtaining, by a fourth network device, N public keys may include: receiving, by the fourth network device, a reference identifier request message sent by the second network device, where the reference identifier request message includes the public keys in the N public-private key pairs, and the reference identifier request message is used to request the fourth network device to allocate reference identifiers to the public keys in the N public-private key pairs.

In a possible implementation, the method may further include: obtaining, by the fourth network device, a first public key from the N public keys, and obtaining, from the N reference identifiers, a reference identifier used to index the first public key; and sending, by the fourth network device, the first public key and the reference identifier to user equipment.

According to a sixth aspect, an embodiment of this application provides a key management apparatus, and the apparatus may include: an encryption unit, configured to encrypt user identity information based on a first public key; and a sending unit, configured to send a first user identity message to a first network device, where the first user identity message includes the user identity information, an indication identifier used to indicate whether the user identity information is encrypted, and a reference identifier used to index the first public key, so that the first network device processes the first user identity message based on the indication identifier and the reference identifier.

In a possible implementation, the encryption unit is further configured to determine whether to encrypt the user identity information; and the sending unit is further configured to: when it is determined that the user identity information is not to be encrypted, send, by the user equipment, a second user identity message to the first network device, where the second user identity message includes the unencrypted user identity information and the indication identifier.

In a possible implementation, the apparatus may further include: a judgment unit, configured to determine whether the first public key is in a validity period, where the encryption unit is specifically configured to: when the first public key is in the validity period, encrypt the user identity information based on the first public key.

For implementation principles and beneficial effects of the units in the key management apparatus provided in this embodiment, refer to the embodiment of the key management method provided in the first aspect. Details are not described herein again.

According to a seventh aspect, an embodiment of this application provides a key management apparatus, and the apparatus may include: a receiving unit, configured to receive a first user identity message sent by user equipment, where the first user identity message includes user identity information, an indication identifier used to indicate whether the user identity information is encrypted, and a reference identifier used to index a first public key; and a sending unit, configured to: if the indication identifier indicates that the user identity information is in an encrypted state, send a third user identity message to a second network device based on the reference identifier, where the third user identity message includes the user identity information and the reference identifier, so that the second network device processes the user identity information based on the reference identifier.

In a possible implementation, the sending unit is specifically configured to send the first user identity message to a third network device based on the reference identifier, so that the third network device sends the third user identity message to the second network device when the indication identifier indicates that the user identity information is in the encrypted state.

In a possible implementation, the sending unit is specifically configured to determine, based on the reference identifier, identification information of the second network device corresponding to the first public key, and send the third user identity message to the second network device based on the identification information of the second network device.

In a possible implementation, the apparatus may further include an encryption unit and a comparison unit, where the receiving unit is further configured to receive a fourth identity message sent by the second network device, where the fourth user identity message includes the decrypted user identity information and the first public key; the encryption unit is configured to encrypt the decrypted user identity information by using the first public key, to generate user identity information that needs to be verified; the comparison unit is configured to compare the user identity information that needs to be verified and the user identity information; and the sending unit is further configured to: if the user identity information that needs to be verified is the same as the user identity information, send instruction information to the third network device, where the instruction message includes the decrypted user identity information, and the instruction information is used to instruct the third network device to process the decrypted user identity information.

In a possible implementation, the receiving unit is specifically configured to receive the fourth user identity message forwarded by the third network device.

In a possible implementation, the apparatus may further include a determining unit, where the receiving unit is further configured to receive a mapping table that is between identification information of the second network device and N reference identifiers and that is sent by the second network device, where the N reference identifiers are used to one-to-one correspondingly index N public keys, the first public key is any one of the N public keys, and N is an integer greater than 0; and that the determining unit is configured to determine, based on the reference identifier, identification information of the second network device corresponding to the first public key includes: the determining unit is further configured to determine, according to the mapping table between the identification information of the second network device and the N reference identifiers, the identification information of the second network device corresponding to the first public key.

For implementation principles and beneficial effects of the units in the key management apparatus provided in this embodiment, refer to the embodiment of the key management method provided in the second aspect. Details are not described herein again.

According to an eighth aspect, an embodiment of this application provides a key management apparatus, and the apparatus may include: a receiving unit, configured to receive a third user identity message sent by a first network device, where the third user identity message includes user identity information and a reference identifier used to index a first public key; a determining unit, configured to determine, based on the reference identifier, a first private key corresponding to the first public key, where the first public key and the first private key are a first public-private key pair; a decryption unit, configured to decrypt the user identity information based on the first private key, to obtain the decrypted user identity information; and a sending unit, configured to send the decrypted user identity information to a third network device, so that the third network device processes the decrypted user identity information.

In a possible implementation, the receiving unit is specifically configured to receive the third user identity message forwarded by the third network device.

In a possible implementation, the apparatus may further include: a judgment unit, configured to determine whether the first public key is in a validity period, where the determining unit is specifically configured to: when the first public key is in the validity period, determine, based on the reference identifier, the first private key corresponding to the first public key.

In a possible implementation, the apparatus may further include: an obtaining unit, configured to obtain N public-private key pairs and N reference identifiers, where the N reference identifiers are used to one-to-one correspondingly index the N public-private key pairs, the first public-private key pair is any one of the N public-private key pairs, and N is an integer greater than 0.

In a possible implementation, the obtaining unit is specifically configured to generate the N public-private key pairs and allocate reference identifiers to public keys in the N public-private key pairs.

In a possible implementation, the obtaining unit is specifically configured to generate the N public-private key pairs; and the sending unit is further configured to send a reference identifier request message to a fourth network device, where the reference identifier request message includes public keys in the N public-private key pairs, and the reference identifier request message is used to request the fourth network device to allocate reference identifiers to the public keys in the N public-private key pairs; and the receiving unit is further configured to receive the public keys in the N public-private key pairs and the N reference identifiers that are sent by the fourth network device.

In a possible implementation, the receiving unit is further configured to receive the N public-private key pairs and the N reference identifiers that are sent by a fourth network device.

In a possible implementation, the obtaining unit is further configured to obtain the first public key from the N public-private key pairs and obtain the reference identifier from the N reference identifiers; and the sending unit is further configured to send the first public key and the reference identifier to user equipment.

In a possible implementation, the sending unit is further configured to send a fourth user identity message to the first network device, where the fourth user identity message includes the decrypted user identity information and the first public key, so that the first network device processes the fourth user identity message based on the first public key.

In a possible implementation, the sending unit is further configured to forward the fourth user identity message to the first network device by using the third network device.

In a possible implementation, the sending unit is further configured to send a public key update request message to the user equipment when the first public key is not in the validity period, where the public key update request message is used to instruct the user equipment to update the first public key.

In a possible implementation, the receiving unit is further configured to send a mapping table between identification information of the second network device and N reference identifiers to the first network device, where the N reference identifiers are used to one-to-one correspondingly index N public keys, the first public key is any one of the N public keys, and N is an integer greater than 0; and the receiving unit is specifically configured to receive the third user identity message sent by the first network device according to the mapping table between the identification information of the second network device and the N reference identifiers.

For implementation principles and beneficial effects of the units in the key management apparatus provided in this embodiment, refer to the embodiment of the key management method provided in the third aspect. Details are not described herein again.

According to a ninth aspect, an embodiment of this application provides a key management apparatus, and the apparatus may include: a receiving unit, configured to receive a first user identity message sent by a first network device, where the first user identity message includes user identity information, an indication identifier used to indicate whether the user identity information is encrypted, and a reference identifier used to index a first public key; a determining unit, configured to: if the indication identifier indicates that the user identity information is in an encrypted state, determine, based on the reference identifier, identification information of a second network device corresponding to the reference identifier; and a sending unit, configured to send a third user identity message to the second network device based on the identification information of the second network device, where the third user identity message includes the user identity information and the reference identifier that is used to index the first public key, so that the second network device processes the third user identity message based on the reference identifier.

In a possible implementation, the receiving unit is further configured to receive a fourth user identity message sent by the second network device, where the fourth user identity message includes the decrypted user identity information and the first public key; and the sending unit is further configured to send the fourth user identity message to the first network device, so that the first network device processes the fourth user identity message based on the first public key.

In a possible implementation, the receiving unit is further configured to receive instruction information sent by the first network device, where the instruction message includes the decrypted user identity information, and the instruction information is used to instruct the third network device to process the decrypted user identity information.

In a possible implementation, the receiving unit is further configured to receive a mapping table that is between identification information of the second network device and N reference identifiers and that is sent by the second network device, where the N reference identifiers are used to one-to-one correspondingly index N public keys, the first public key is any one of the N public keys, and N is an integer greater than 0; and the determining unit is specifically configured to determine, according to the mapping table between the identification information of the second network device and the N reference identifiers, the identification information of the second network device corresponding to the reference identifier.

In a possible implementation, the sending unit is further configured to send a mapping table between identification information of the third network device and the N reference identifiers to the first network device; and the receiving unit is specifically configured to receive the first user identity message of user equipment forwarded by the first network device according to the mapping table between the identification information of the third network device and the N reference identifiers.

For implementation principles and beneficial effects of the units in the key management apparatus provided in this embodiment, refer to the embodiment of the key management method provided in the fourth aspect. Details are not described herein again.

According to a tenth aspect, an embodiment of this application provides a key management apparatus, and the apparatus may include: an obtaining unit, configured to obtain N public keys, where N is an integer greater than 0; an allocation unit, configured to allocate N reference identifiers to the N public keys, where the N reference identifiers are used to one-to-one correspondingly index the N public keys; and a sending unit, configured to send the N public keys and the N reference identifiers to a second network device, so that the second network device obtains the N public keys and the N reference identifiers.

In a possible implementation, the obtaining unit is specifically configured to generate N public-private key pairs, where each public-private key pair includes a public key and a private key, and the N public keys are public keys in the N public-private key pairs; and the sending unit is further configured to send the N public-private key pairs and the N reference identifiers to the second network device.

In a possible implementation, the receiving unit is further configured to receive a reference identifier request message sent by the second network device, where the reference identifier request message includes the public keys in the N public-private key pairs, and the reference identifier request message is used to request the fourth network device to allocate reference identifiers to the public keys in the N public-private key pairs.

In a possible implementation, the obtaining unit is further configured to obtain a first public key from the N public keys, and obtain, from the N reference identifiers, a reference identifier used to index the first key; and the sending unit is further configured to send the first public key and the reference identifier to user equipment.

For implementation principles and beneficial effects of the units in the key management apparatus provided in this embodiment, refer to the embodiment of the key management method provided in the first aspect. Details are not described herein again.

According to an eleventh aspect, an embodiment of this application further provides a device, including a processor and a memory.

The memory is configured to store an instruction, and the processor is configured to execute the instruction stored in the memory. When the processor executes the instruction stored in the memory, the device performs the method according to any embodiment in the first aspect to the fifth aspect.

According to a twelfth aspect, an embodiment of this application provides a readable storage medium, and the readable storage medium stores an instruction.

When at least one processor of user equipment executes the instruction, the user equipment performs the key management method provided in the method embodiments in the first aspect to the fifth aspect.

According to a thirteenth aspect, an embodiment of this application provides a readable storage medium, and the readable storage medium stores an instruction. When at least one processor of a network device executes the instruction, the network device performs the key management method provided in the method embodiments in the first aspect to the fifth aspect.

According to the key management method and apparatus provided in the embodiments of this application, when determining to encrypt the user identity information, the user equipment encrypts the user identity information based on the first public key, and sends the first user identity message to the first network device, where the first user identity message includes the user identity information, the indication identifier used to indicate whether the user identity information is encrypted, and the reference identifier used to index the first public key, so that when receiving the first user identity information, the first network device determines, based on the indication identifier, whether the user identity information is in the encrypted state, and if the indication identifier indicates that the user identity information is in the encrypted state, the first network device determines, based on the reference identifier, the identification information of the second network device corresponding to the first public key, and sends the third user identity message to the second network device. Therefore, when receiving the third user identity message of the user equipment, the second network device decrypts the user identity information based on the first private key, to obtain the decrypted user identity information, and performs authentication on the user identity information by using an ARPF device. It can be learned that according to the public key management method and apparatus provided in the embodiments of this application, the user equipment encrypts the user identity information based on the first public key, and sends, to the second network device by using the first network device, the third user identity message including the encrypted user identity information and the reference identifier that is used to index the first public key, so that when receiving the third user identity message, the second network device can determine, based on the pre-stored mapping table between the public-private key pairs and the reference identifiers, the first private key corresponding to the first public key, to decrypt the encrypted user identity information by using the first private key, thereby improving the data decryption efficiency.

DESCRIPTION OF EMBODIMENTS

Figure 1:
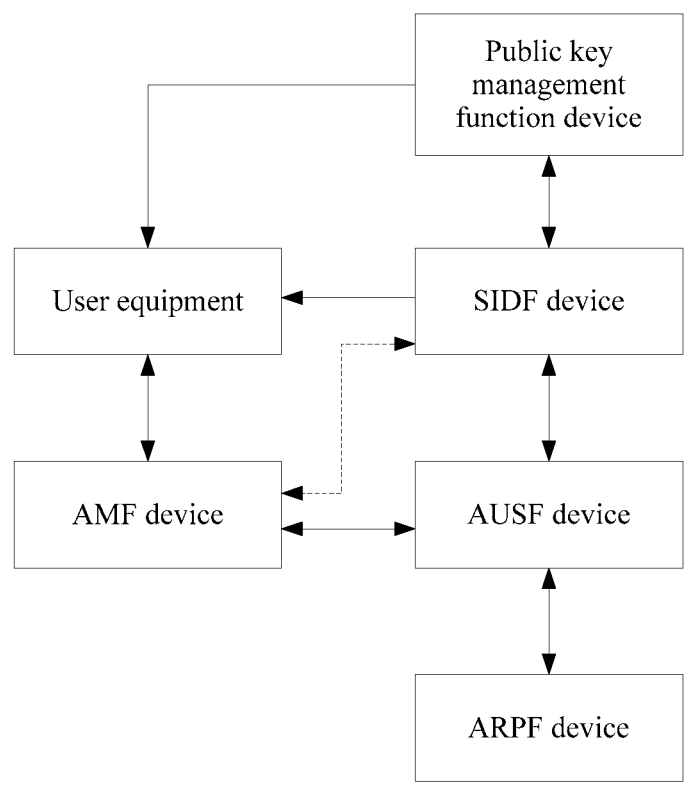
FIG. 1 is a diagram of a system architecture according to an embodiment of this application.

FIG. 1 is an architectural diagram of a system according to an embodiment of this application. Referring to FIG. 1, in the communications system, a first network device is an access and mobility management function (AMF) device, a second network device is a subscription identifier de-concealing function (SIDF) device, a third network device is an authentication unit function (AUSF) device, and a fourth network device is a public key management function device in which a public key management function is integrated. The communications system includes user equipment, the AMF device, the AUSF device, the SIDF device, the public key management function device, and an authentication server that is an authentication repository function (ARPF) device. In a system architecture shown in FIG. 1, the user equipment may interact with the SIDF device by using the AMF device and the AUSF device, or interact with the SIDF device by using only the AMF device.

The user equipment may be a mobile phone (or referred to as a "cellular" phone) or a computer with a mobile terminal, for example, a portable, pocket-sized, handheld, computer built-in, or in-vehicle mobile apparatus. The user equipment may also be referred to as a terminal device, a mobile station (MS for short) or a terminal, or the user equipment may further include a subscriber unit, a cellular phone, a smartphone, a wireless data card, a personal digital assistant (PDA) computer, a tablet computer, a wireless modem (modem), a handheld device, a laptop computer, a cordless phone, a wireless local loop (WLL) station, a machine type communication (MTC) terminal, or the like.

The AMF device is used to forward messages exchanged between the user equipment and the AUSF device, and is further responsible for mobility management in a mobile network, such as user location update, user network registration, and user switching.

The AUSF device is used to forward messages exchanged between the AMF device and the SIDF device, and is further responsible for interacting with the ARPF device, and performing authentication on user identity information by using the ARPF device.

The SIDF device is used to generate a public-private key pair, allocate a reference identifier to the public-private key pair, decrypt the user identity information by using a private key stored in the SIDF device, and interact with the AUSF device and the public key management function device.

The public key management function device is used to generate a public-private key pair, allocate a reference identifier to the public-private key pair, and send the generated public-private key pair and the reference identifier to the SIDF device, so that the SIDF device decrypts the user identity information by using a private key.

The ARPF device is mainly used to interact with the AUSF device and is mainly responsible for performing authentication on the user identity information.

In an existing public key encryption system, at least one set of public-private key pair is allowed to encrypt and decrypt the user identity information. When the at least one set of public-private key pair exists in the public key encryption system, the AUSF device cannot determine a public-private key pair of which a public key is used by user equipment to encrypt the user identity information, and consequently, cannot determine a public-private key pair of which a private key is used to decrypt the encrypted user identity information, resulting in reduced data decryption efficiency. To improve the data decryption efficiency, a public key management method is provided in this application. When determining to encrypt the user identity information, the user equipment encrypts the user identity information by using a first public key, and sends a first user identity message to the AMF device. The first user identity message includes the user identity information, an indication identifier used to indicate whether the user identity information is encrypted, and a reference identifier used to index the first public key, so that the AMF device sends the encrypted user identity information and the reference identifier to the SIDF device based on the indication identifier and the reference identifier. Correspondingly, the SIDF device may also search for, based on the reference identifier, a first private key corresponding to the first public key indexed by the reference identifier, and decrypt the user identity information by using the first private key, thereby improving the data decryption efficiency.

It should be noted that in the public key management method provided in this application, when sending the user identity information and the reference identifier (that is, a third user identity message in this application) to the SIDF device based on the reference identifier, the AMF device may directly send the third user identity message to the SIDF device based on the reference identifier, or may forward the third user identity message to the SIDF device by using the AUSF based on the reference identifier. Specific embodiments are used below to describe in detail the technical solutions of this application. It should be noted that the following specific embodiments may be combined with each other, and same or similar content is not repeatedly described in different embodiments.

It should be noted that the public key management method in this application may be divided into two main processes: a process of decrypting the user identity information encrypted by using a public key and a public key generation and delivering process. Specifically, for the process of decrypting the user identity information encrypted by using the public key, refer to embodiments shown in FIG. 2A to FIG. 6. For the public key generation and delivering process, refer to embodiments shown in FIG. 7 to FIG. 9.

Figure 2A:
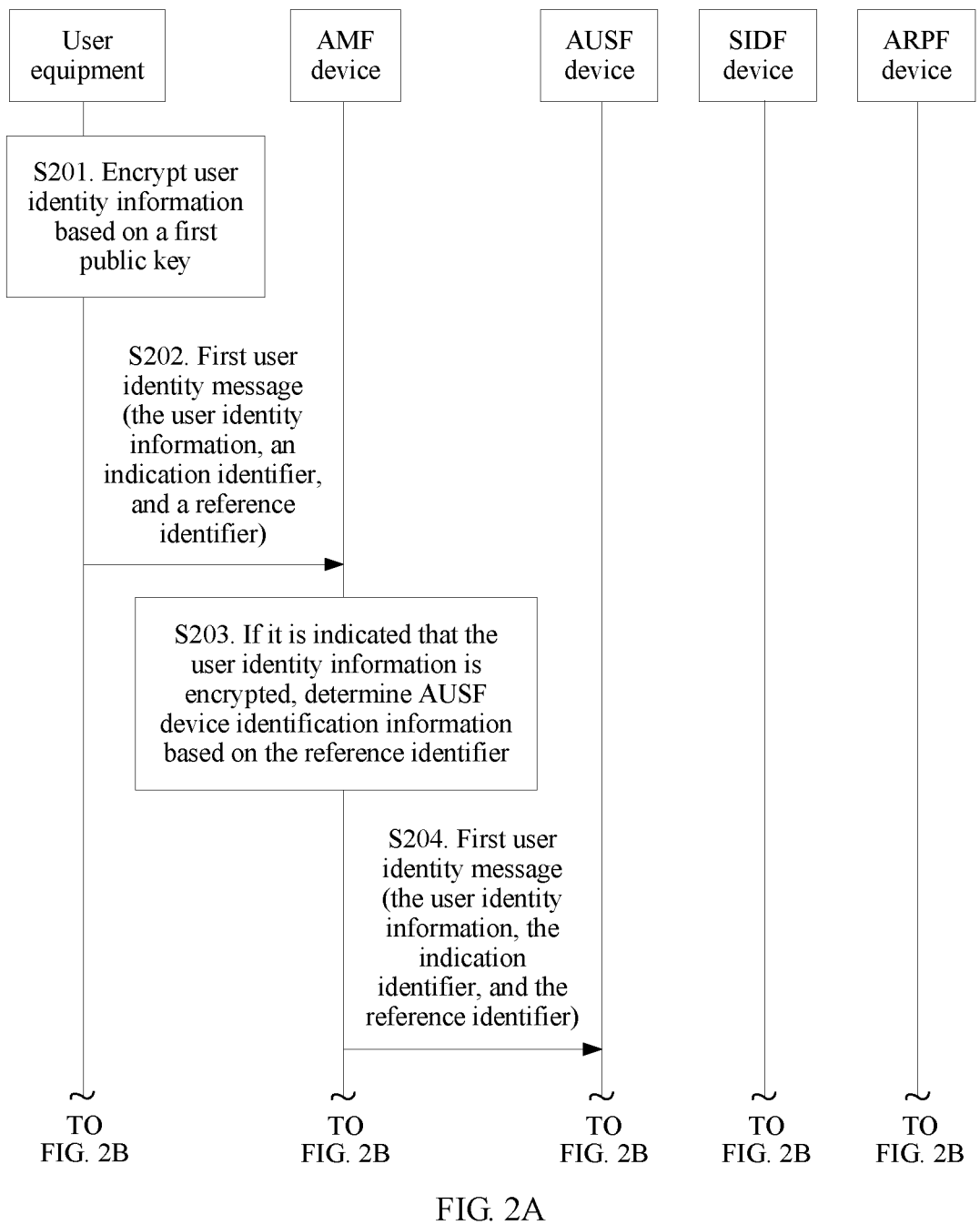
FIG. 2A and FIG. 2B are a sequence diagram 1 of a key management method according to this application.
Figure 2B:
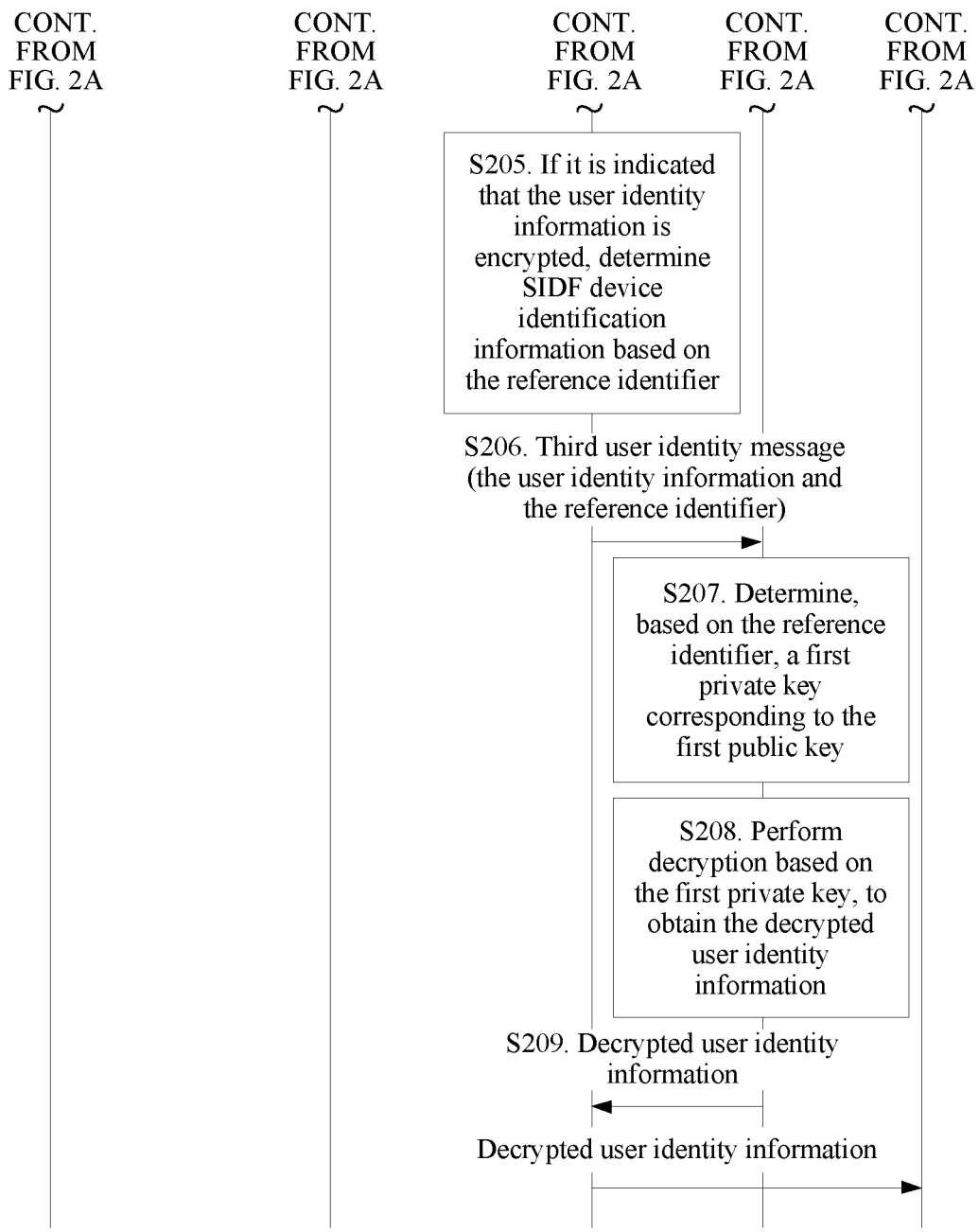

FIG. 2A and FIG. 2B are a sequence diagram 1 of a key management method according to this application. In an embodiment shown in FIG. 2A and FIG. 2B, an AMF device forwards a third user identity message to an SIDF device by using an AUSF device. Referring to FIG. 2A and FIG. 2B, the key management method may include the following steps.

S201. User equipment encrypts user identity information based on a first public key.

For example, before encrypting the user identity information based on the first public key, the user equipment may first receive the first public key and a reference identifier that is used to index the first public key that are sent by the SIDF device or a public key management function device, to obtain the first public key used to encrypt the user identity information and the corresponding reference identifier.

After obtaining the first public key, the user equipment can encrypt the user identity information based on the first public key. For example, when the user identity information is encrypted based on the first public key, the user identity information may be directly encrypted by using the first public key; or the user identity information may be first encrypted by using a temporary public key, and then the user identity information encrypted by using the temporary public key is encrypted by using the first public key. Optionally, before encrypting the user identity information based on the first public key, the user equipment may first determine whether the first public key is in a validity period. When the first public key is in the validity period, the user equipment encrypts the user identity information based on the first public key. It should be noted that when the user equipment determines whether the first public key is in the validity period, the user equipment further needs to receive a first public key use period sent by the SIDF device or the public key management function device, so that the user equipment determines, based on the use period of the first public key, whether the first public key is in the validity period. For example, the use period of the first public key may be represented by a production date and an expiration date of the first public key, or may be represented by a production date and a useful period of the first public key.

S202. The user equipment sends a first user identity message to the AMF device.

The first user identity message includes the user identity information (that is, the encrypted user identity information), an indication identifier used to indicate whether the user identity information is encrypted, and the reference identifier used to index the first public key. Optionally, the first user identity message may further include an encryption protocol supported by the first public key. For example, the first user identity message may be carried in a non-access stratum (NAS) packet and sent to the AMF device. To be specific, the user identity information, the indication identifier used to indicate whether the user identity information is encrypted, and the reference identifier used to index the first public key may be carried in the NAS packet.

It should be noted that the reference identifier used to index the first public key may be a pre-allocated number, may be geographic information implying the identity management network device, or may be the first public key. When the indication identifier indicates whether the user identity information is encrypted, when being a number greater than 0, the indication identifier may indicate that the user identity is in an encrypted state, or when being 0, the indication identifier indicates that the user identity information is in an unencrypted state. Optionally, when being 0, the reference identifier may also indicate that the user identity information is in an unencrypted state.

S203. If the indication identifier indicates that the user identity information is in the encrypted state, the AMF device determines, based on the reference identifier, AUSF device identification information corresponding to the first public key.

S204. The AMF device forwards the first user identity message to the AUSF device based on the AUSF device identification information.

When receiving the first user identity message sent by the user equipment, the AMF device determines, based on the indication identifier that is used to indicate whether the user identity information is encrypted and that is included in the first user identity message, whether the user identity is encrypted, and when determining that the user identity information is encrypted, determines, based on the reference identifier, the AUSF device identification corresponding to the first public key, to forward the first user identity message to the AUSF device based on the AUSF device identification information.

Optionally, in this embodiment of this application, in steps S203 and S204, that the AMF device determines, based on the reference identifier, the AUSF device identification corresponding to the first public key, and forwards the user identity message to the AUSF device based on the AUSF device identification information may include: The AMF device receives and stores in advance a mapping table that is between AUSF device identification information and N reference identifiers and that is sent by the AUSF device, so that after receiving the first user identity message sent by the user equipment, the AMF device can determine, according to the mapping table between the AUSF device identification information and the N reference identifiers, the AUSF device identification information corresponding to the first public key, to send the first user identity message to the AUSF device. The N reference identifiers are used to one-to-one correspondingly index N public keys, the first public key is any one of the N public keys, and N is an integer greater than 0.

S205. If the indication identifier indicates that the user identity information is in an encrypted state, the AUSF device determines, based on the reference identifier, SIDF device identification information corresponding to the reference identifier.

S206. The AUSF device sends the third user identity message to the SIDF device based on the SIDF device identification information.

The third user identity message includes the user identity information (to be specific, the encrypted user identity information) and the reference identifier used to index the first public key. After receiving the first user identity message of the user equipment, the AUSF device determines, based on the indication identifier that is used to indicate whether the user identity information is encrypted and that is in the first user identity message, whether the user identity is in the encrypted state. When determining that the user identity information is in an unencrypted state, the AUSF device directly sends the user identity information to an ARPF device for authentication. When determining that the user identity information is in the encrypted state, the AUSF device only needs to send, to the SIDF device, the user identity information encrypted by using the first public key and the reference identifier used to index the first public key, so that the SIDF directly searches for, based on the reference identifier, a first private key corresponding to the first public key, to decrypt the encrypted user identity information by using the first private key, and the indication identifier used to indicate whether the user identity information is encrypted does not need to be sent. Optionally, the third user identity message may further include the encryption protocol supported by the first public key.

After receiving the first user identity message forwarded by the AMF device, the AUSF device determines, based on the indication identifier that is used to indicate whether the user identity information is encrypted and that is included in the first user identity message, whether the user identity is in the encrypted state, and when determining that the user identity information is in the encrypted state, determines, based on the reference identifier, the SIDF device identification information corresponding to the reference identifier, to forward the third user identity message to the SIDF device based on the SIDF device identification information.

Optionally, in this embodiment of this application, in S205 and S206, that the AUSF device determines, based on the reference identifier, the SIDF device identification information corresponding to the reference identifier, and sends the third user identity message to the SIDF device based on the SIDF device identification information may include: The AUSF device receives and pre-stores a mapping table that is between SIDF device identification information and the N reference identifiers and that is sent by the SIDF device, so that after receiving the first user identity message sent by the user equipment, the AUSF device may determine, according to the mapping table between the SIDF device identification information and the N reference identifiers, the SIDF device identification information corresponding to the reference identifier, to send the third user identity message to the SIDF device.

S207. The SIDF device determines, based on the reference identifier, the first private key corresponding to the first public key.

The first public key and the first private key are a first public-private key pair.

In this embodiment of this application, the SIDF device may pre-store a mapping table between N public-private key pairs and the N reference identifiers, so that after receiving the third user identity message, the SIDF can search for, based on the reference identifier included in the third user identity message, the first private key corresponding to the first public key, to decrypt the encrypted user identity information based on the first private key.

S208. The SIDF device decrypts the user identity information based on the first private key, to obtain the decrypted user identity information.

S209. The SIDF device sends the decrypted user identity information to the AUSF device, so that the AUSF device processes the decrypted user identity information.

For example, in this embodiment of this application, the SIDF device sends the decrypted user identity information to the AUSF device, and the AUSF device sends the decrypted user identity information to the ARPF device, so that the ARPF device performs authentication on the user identity information.

Figure 3A:
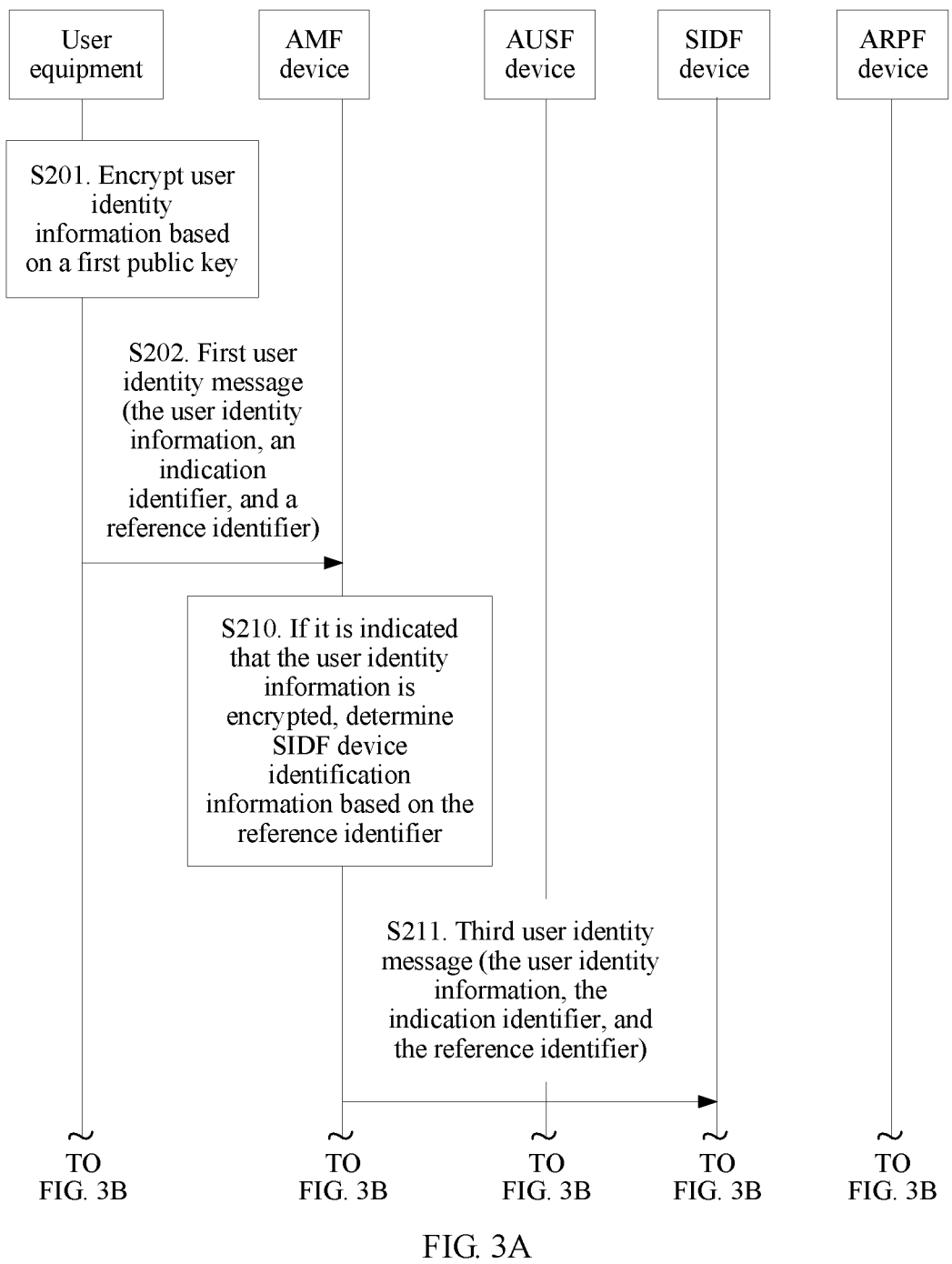
FIG. 3A and FIG. 3B are a sequence diagram 2 of a public key management method according to this application.
Figure 3B:
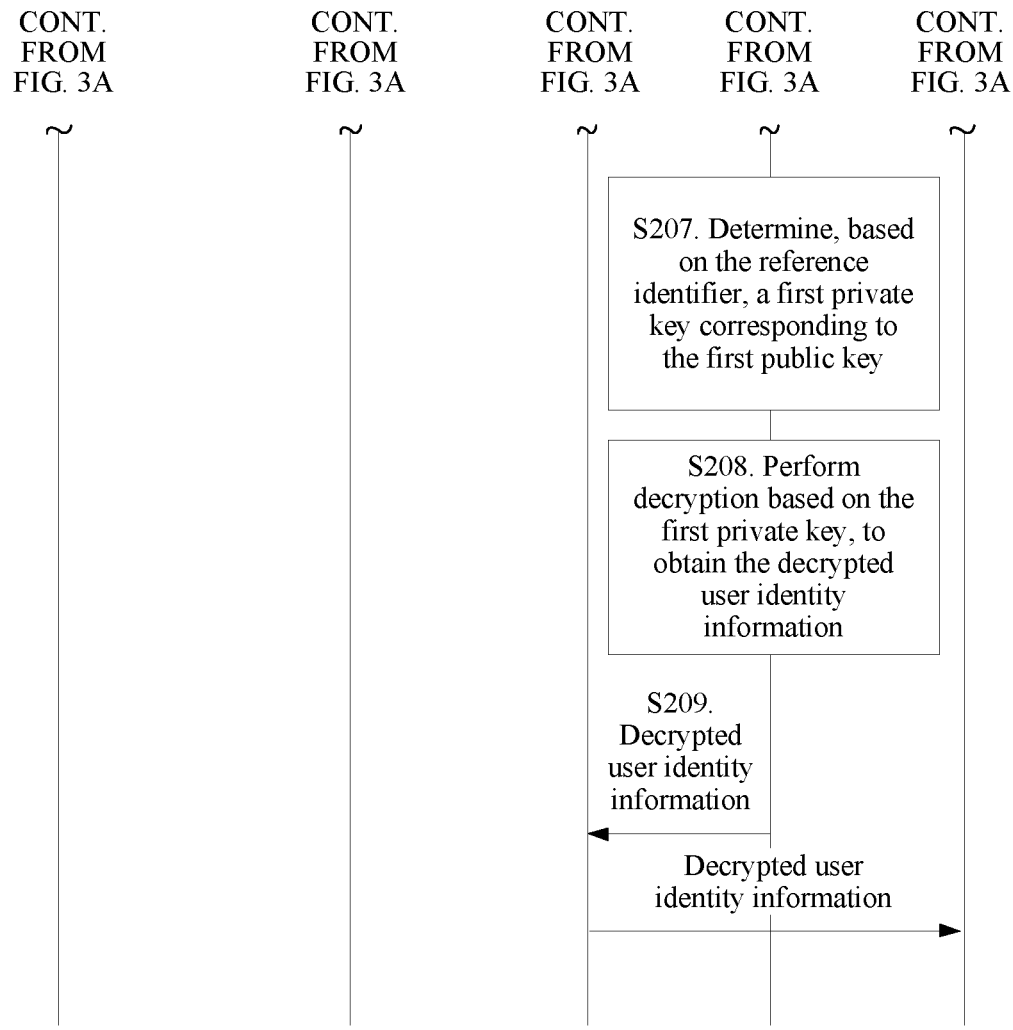

It should be noted that in the embodiment shown in FIG. 2A and FIG. 2B, S203 to S206 may also be replaced by the following S210 and S211. To be specific, the AMF device directly sends the third user identity message to the SIDF device based on the reference identifier. For details, refer to FIG. 3A and FIG. 3B. FIG. 3A and FIG. 3B are a sequence diagram 2 of a key management method according to this application.

S210. If the indication identifier indicates that the user identity information is in the encrypted state, the AMF device determines, based on the reference identifier, SIDF device identification information corresponding to the first public key.

Optionally, before S210 in which the AMF device determines, based on the reference identifier, the SIDF device identification information corresponding to the first public key, the method may further include:

The AMF device receives a mapping table that is between SIDF identification information and N reference identifiers and that is sent by the SIDF device. The N reference identifiers are used to one-to-one correspondingly index N public keys, the first public key is any one of the N public keys, and N is an integer greater than 0. The AMF device determines, according to the mapping table between the SIDF device identification information and the N reference identifiers, the SIDF device identification information corresponding to the first public key. It should be noted that the mapping table between the SIDF device identification information and the N reference identifiers may also be generated by the AMF device based on system configuration information.

S211. The AMF device forwards the third user identity message to the SIDF device based on the SIDF device identification information.

According to the public key management method provided in this embodiment of this application, when determining to encrypt the user identity information, the user equipment encrypts the user identity information based on the first public key, and sends the first user identity message to the AMF device, where the first user identity message includes the user identity information, the indication identifier used to indicate whether the user identity information is encrypted, and the reference identifier used to index the first public key, so that when receiving the first user identity information, the AMF device determines, based on the indication identifier, whether the user identity information is in the encrypted state. If the indication identifier indicates that the user identity information is in the encrypted state, the AMF device determines, based on the reference identifier, the AUSF device identification information corresponding to the first public key, and sends the first user identity message to the AUSF device. Similarly, when receiving the first user identity information, the AUSF device determines, based on the indication identifier, whether the user identity information is in the encrypted state. If the indication identifier indicates that the user identity information is in the encrypted state, the AUSF device determines, based on the reference identifier, the SIDF device identification information corresponding to the reference identifier, and sends the third user identity message to the SIDF device, so that when receiving the third user identity message of the user equipment, the SIDF device decrypts the user identity information based on the first private key, obtains the decrypted user identity information, and sends the decrypted user identity information to the ARPF device. Therefore, the ARPF device performs authentication on the user identity information. It can be learned that according to the public key management method provided in this embodiment of this application, the user equipment encrypts the user identity information based on the first public key, and sends, to the SIDF device, the third user identity message including the encrypted user identity information and the reference identifier that is used to index the first public key, so that when receiving the third user identity message, the SIDF device can determine, based on the pre-stored mapping table between the public-private key pairs and the reference identifiers, the first private key corresponding to the first public key, to decrypt the encrypted user identity information by using the first private key, thereby improving data decryption efficiency.

Based on the embodiments shown in FIG. 2A to FIG. 3B, optionally, in this embodiment of this application, before S208 in which the SIDF device determines, based on the reference identifier, the first private key corresponding to the first public key, the method further includes:

The SIDF device determines whether the first public key is in a validity period. When the first public key is in the validity period, S208 is performed, to be specific, the SIDF device determines, based on the reference identifier, the first private key corresponding to the first public key.

Figure 4A:
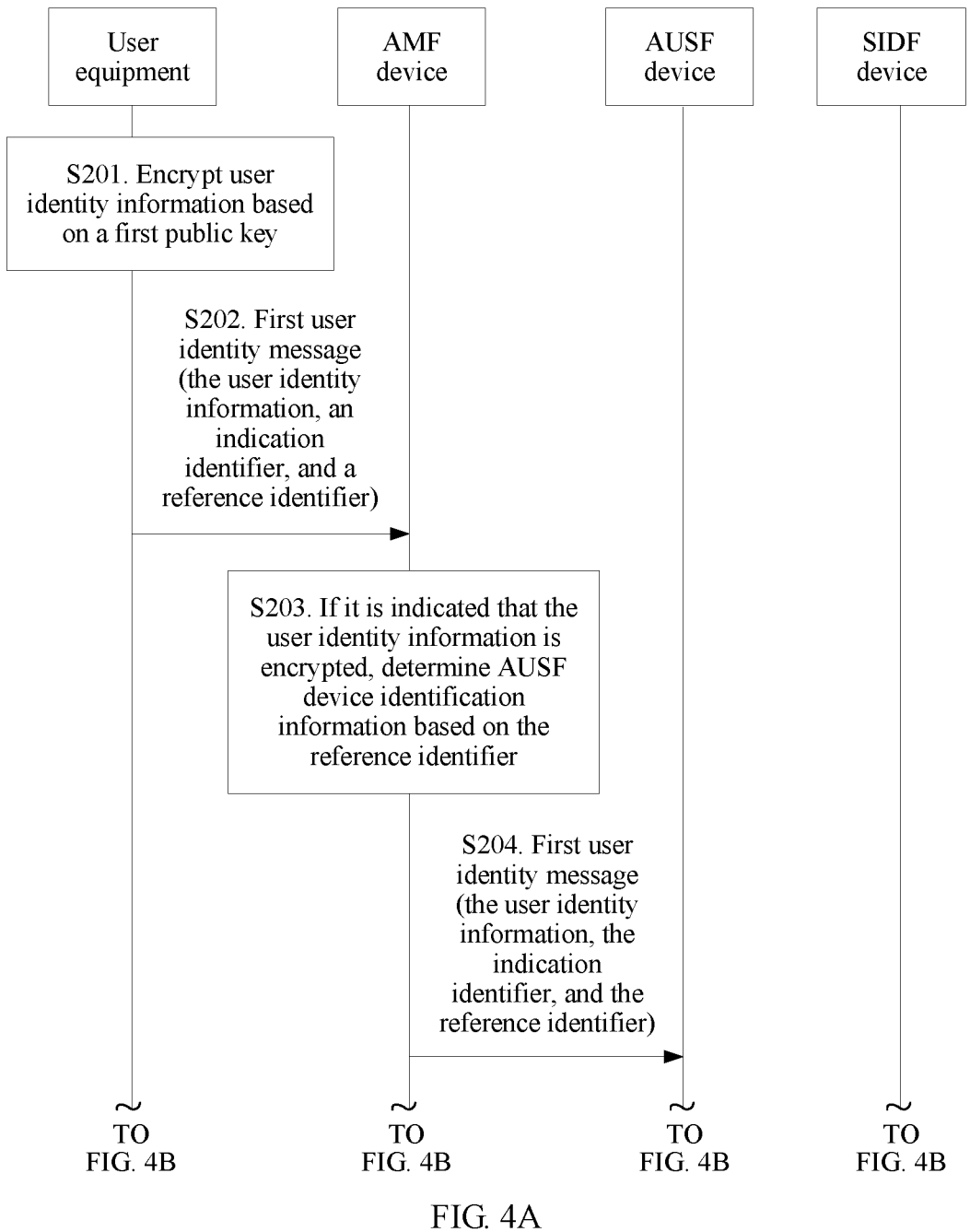
FIG. 4A and FIG. 4B are a sequence diagram 3 of a public key management method according to this application.
Figure 4B:
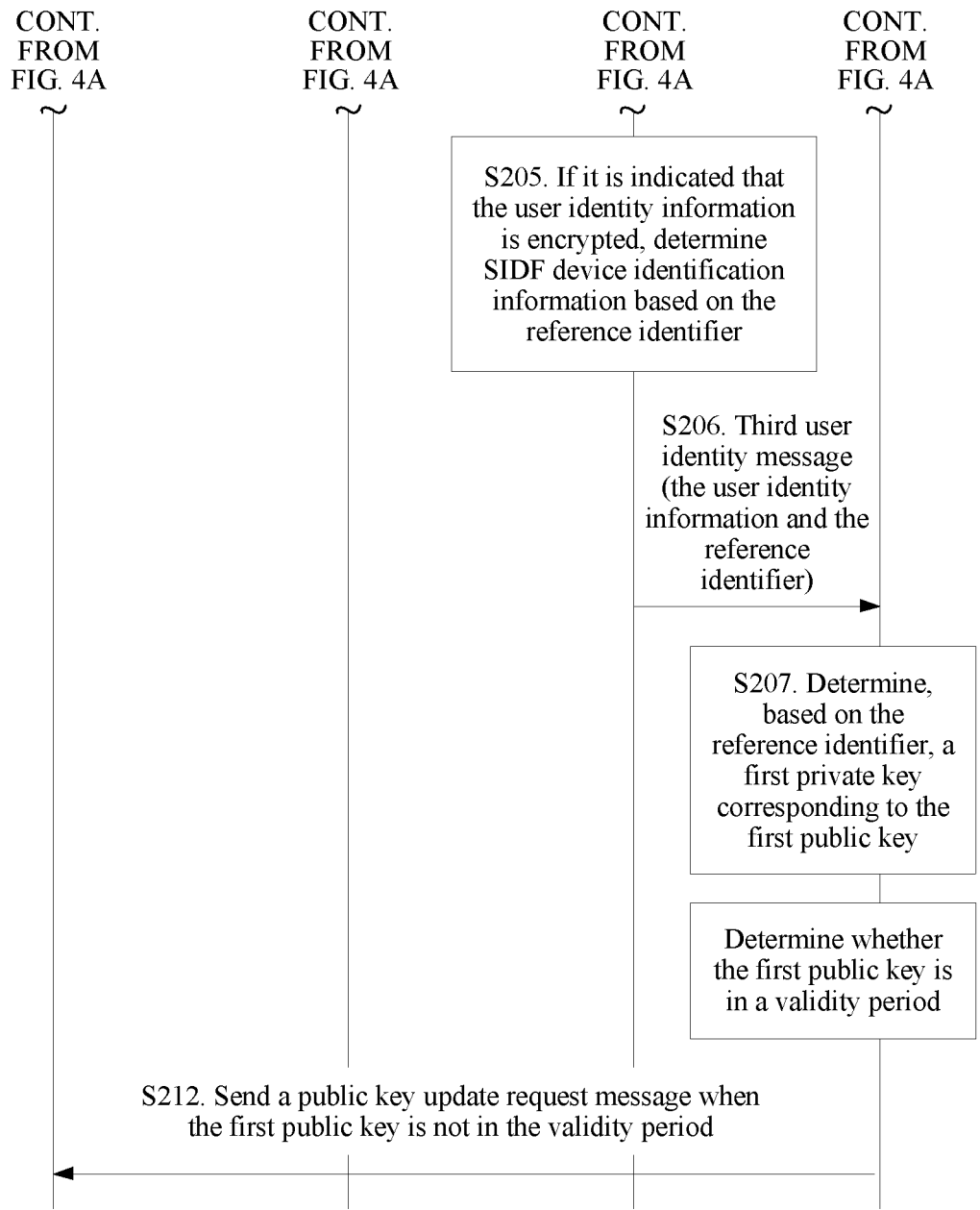

On the contrary, when the first public key is not in the validity period, S210 is directly performed. For details, refer to FIG. 4A and FIG. 4B. FIG. 4A and FIG. 4B are a sequence diagram 3 of a public key management method according to this application.

S212. The SIDF device sends a public key update request message to the user equipment.

The public key update request message is used to instruct the user equipment to update the first public key.

It can be learned that in this application, before S208 in which the SIDF device determines, based on the reference identifier, the first private key corresponding to the first public key, the SIDF device first determines whether the first public key is valid. If the first public key is valid, the SIDF device directly determines the corresponding first private key based on the first public key, to decrypt the encrypted user identity information based on the first private key. If the first public key is invalid, the SIDF device sends the public key update request message to the user equipment, so that the user equipment updates the first public key, thereby improving security of the user identity information.

Figure 5A:
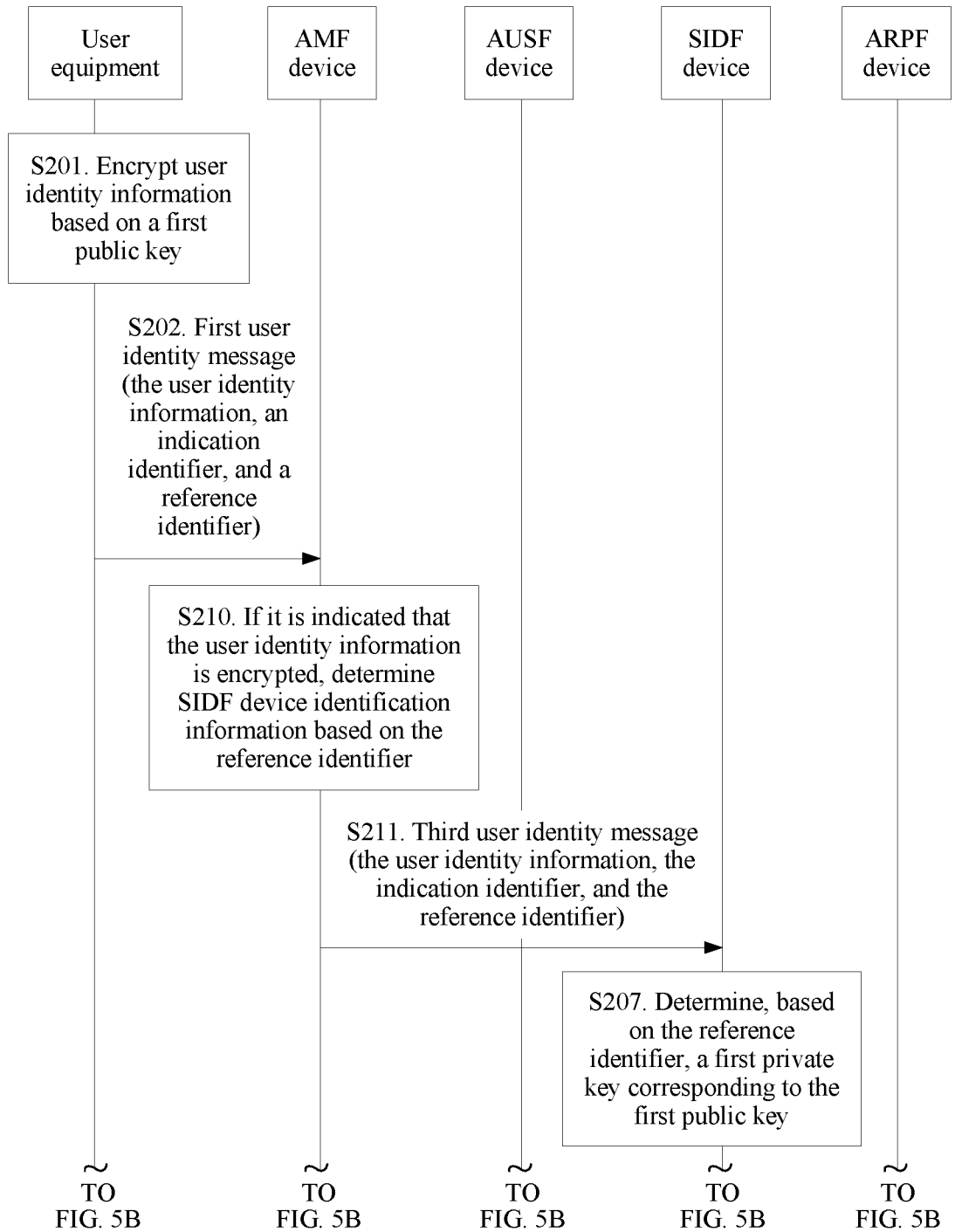
FIG. 5A and FIG. 5B are a sequence diagram 4 of a public key management method according to this application.
Figure 5B:
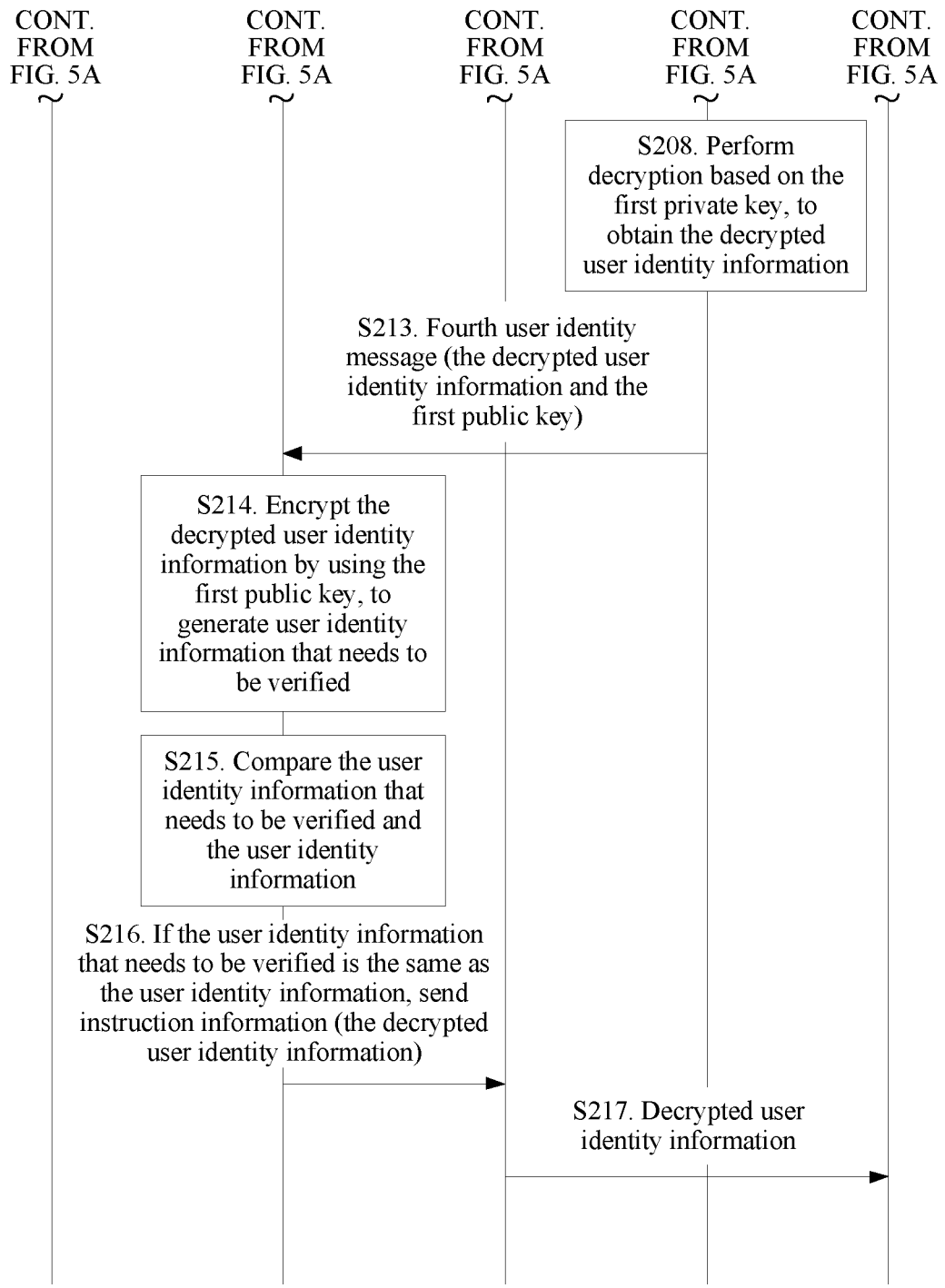

Further, based on the embodiments shown in FIG. 2A to FIG. 3B, to meet a requirement of lawful interception (Law for Interception) for verifying an encrypted identity, optionally, after decrypting the user identity information based on the first private key to obtain the decrypted user identity information, the S208 SIDF device may further send the decrypted user identity information and the first public key to the AMF device, so that the AMF device determines whether registration and authentication are to be performed on the user identity information. For details, refer to FIG. 5A and FIG. 5B. FIG. 5A and FIG. 5B are a sequence diagram 4 of a public key management method according to an embodiment of this application. The public key management method may further include the following steps.

S213. The SIDF device sends a fourth user identity message to the AMF device.

The fourth user identity message includes the decrypted user identity information and the first public key. Optionally, the fourth user identity information may further include the encryption protocol of the first public key, another parameter used for encryption, and the like.

Optionally, when the SIDF device sends the fourth user identity message to the AMF device, the SIDF device may directly send the fourth user identity message to the AMF device, or may forward the fourth user identity message by using the AUSF device. To be specific, the SIDF device may first send the fourth user identity message to the AUSF device, and then the AUSF device forwards the fourth user identity message to the AMF device. In other words, the AMF device may directly receive the fourth user identity information sent by the SIDF device, or may receive the fourth user identity information by using the AUSF device.

S214. The AMF device encrypts the decrypted user identity information by using the first public key, to generate user identity information that needs to be verified.

S215. The AMF device compares the user identity information that needs to be verified and the user identity information.

With reference to the embodiments shown in FIG. 2A to FIG. 3B, the user equipment sends the first user identity message to the AMF device in S202. The first user identity message includes the user identity information, the indication identifier used to indicate whether the user identity information is encrypted, and the reference identifier used to index the first public key. The AMF device pre-obtains the user identity information, and after generating the user identity information that needs to be verified, the AMF device can compare the user identity information that needs to be verified and the user identity information, to determine whether registration and authentication are to be performed on the user identity information.

S216. If the user identity information that needs to be verified is the same as the user identity information, the AMF device sends instruction information to the AUSF device.

The instruction information may include the decrypted user identity information, and the instruction information is used to instruct the third network device to process the decrypted user identity information.

S217. The AUSF device processes the decrypted user identity information.

For example, in this embodiment of this application, that the AUSF device processes the decrypted user identity information means that the AUSF device sends the decrypted user identity information to the ARPF device, so that the ARPF device performs authentication on the user identity information.

Optionally, after S215, the method may further include: If the user identity information that needs to be verified is different from the user identity information, it indicates that the user identity information is illegal. The AMF device may send a registration process interrupt message to the AUSF device, so that the AUSF device stops registration and authentication on the user identity information based on the registration process interrupt message, and does not need to perform S217.

It can be learned that in this embodiment of this application, after obtaining the decrypted user identity information, the SIDF device sends the user identity information to the AMF device, so that the AMF device encrypts the decrypted user identity information based on the first public key, to generate the user identity information that needs to be verified, and compares the user identity information that needs to be verified and the user identity information, to determine, based on a comparison result, whether registration and authentication are to be performed on the user identity information, thereby meeting the requirement of lawful interception for verifying an encrypted identity.

Figure 6:
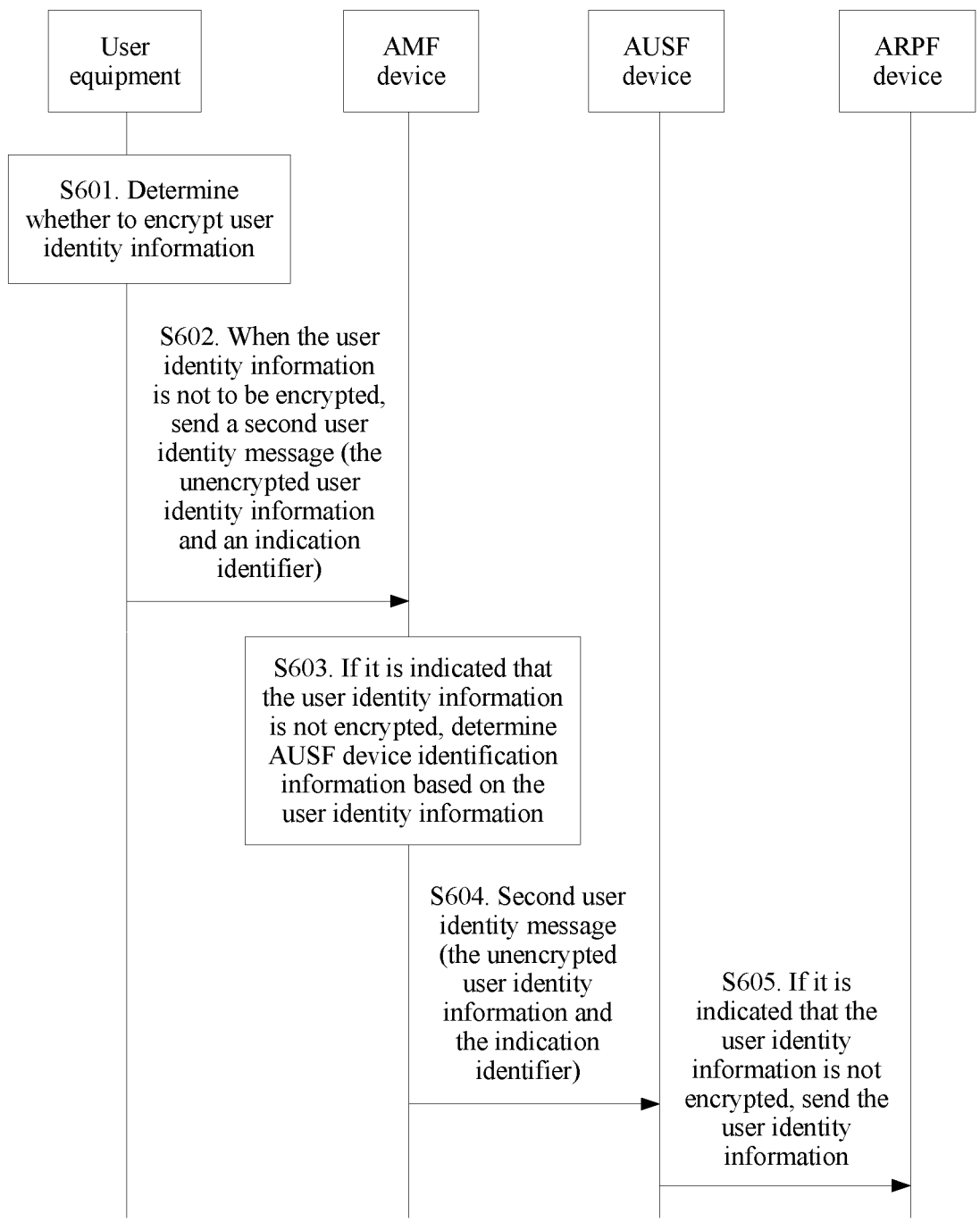
FIG. 6 is a sequence diagram 5 of a public key management method according to this application.

The embodiments shown in FIG. 2A to FIG. 5B describe in detail a process in which when the user equipment determines to encrypt the user identity information, the user identity information encrypted by using the public key is decrypted. If the user equipment does not encrypt the user identity information, FIG. 6 is a sequence diagram 5 of a public key management method according to this application. The public key management method may include the following steps.

S601. The user equipment determines whether to encrypt the user identity information.

Before sending the user identity information, the user equipment first determines whether to encrypt the user identity information. If it is determined to encrypt the user identity information, S201 is performed. If it is determined not to encrypt the user identity information, S602 is performed.

S602. When determining not to encrypt the user identity information, the user equipment sends a second user identity message to an AMF device.

The second user identity message includes the unencrypted user identity information and an indication identifier that is used to indicate whether the user identity information is encrypted. It should be noted that when the indication identifier is 0, it indicates that the user identity information is in an unencrypted state. For example, the second user identity message may be carried in a NAS packet and sent to the AMF device. To be specific, the unencrypted user identity information and the indication identifier that is used to indicate whether the user identity information is encrypted may be carried in the NAS packet.

S603. If the indication identifier indicates that the user identity information is in the unencrypted state, the AMF device determines corresponding AUSF device identification information based on the user identity information.

S604. The AMF device forwards the second user identity message to an AUSF device based on the AUSF device identification information.

When receiving the second user identity message sent by the user equipment, the AMF device determines, based on the indication identifier that is used to indicate whether the user identity information is encrypted and that is included in the second user identity message, whether the user identity information is in the unencrypted state, and when determining that the user identity information is in the unencrypted state, the AMF device determines the corresponding AUSF device identification information based on the user identity information.

S605. If the indication identifier indicates that the user identity information is in the unencrypted state, the AUSF device sends the user identity information to an ARPF device.

When receiving the second user identity message forwarded by the AMF device, the AUSF device determines, based on the indication identifier that is used to indicate whether the user identity information is encrypted and that is included in the second user identity message, whether the user identity information is in the unencrypted state. When determining that the user identity information is in the unencrypted state, the AUSF device directly sends the user identity information to the ARPF device, so that the ARPF device performs authentication on the user identity information.

According to the public key management method provided in this embodiment of this application, the user equipment determines whether to encrypt the user identity information, when determining not to encrypt the user identity information, the user equipment sends the second user identity message to the AMF device, where the second user identity message includes the unencrypted user identity information and the indication identifier that is used to indicate whether the user identity information is encrypted, so that when the AMF device receives the second user identity information, if the indication identifier indicates that the user identity information is in the unencrypted state, the AMF device determines the corresponding AUSF device identification information based on the user identity information, and forwards the second user identity message to the AUSF device. Therefore, when receiving the second user identity message forwarded by the AMF device, the AUSF device sends the user identity information to the ARPF device if the indication identifier indicates that the user identity information is in the unencrypted state. It can be learned that according to the public key management method provided in this embodiment of this application, when the user equipment sends the second user identity message to the AUSF device, because the second user identity message includes the indication identifier used to indicate whether the user identity information is encrypted, when the AUSF device receives the second user identity message, the AUSF device may determine, based on the indication identifier, whether the user identity information is in the unencrypted state. When determining that the user identity information is in the unencrypted state, the AUSF device directly sends the user identity information to the ARPF device, so that the ARPF device performs authentication on the user identity information, thereby improving data decryption efficiency.

Figure 8:
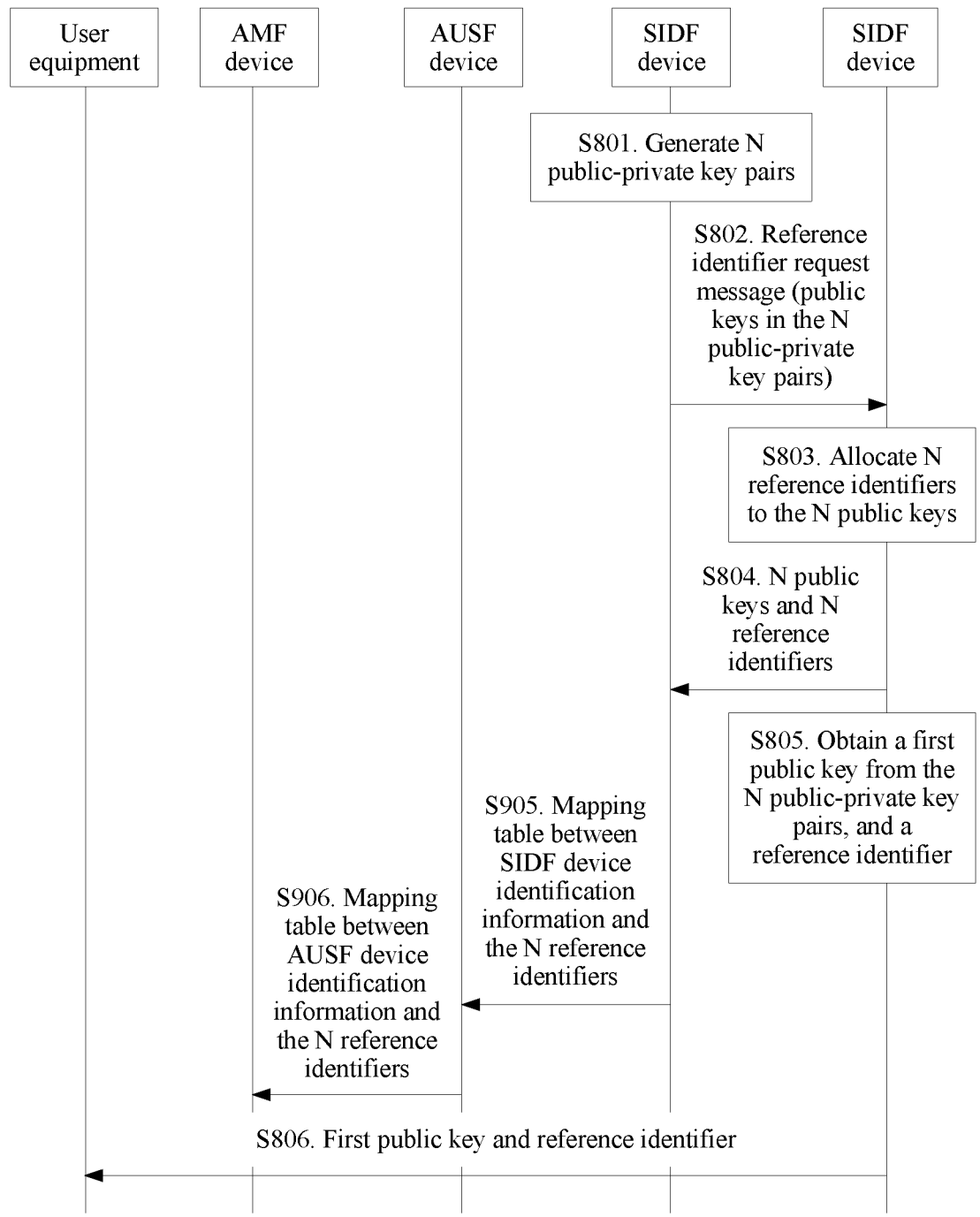
FIG. 8 is a sequence diagram 7 of a public key management method according to this application.
Figure 9:
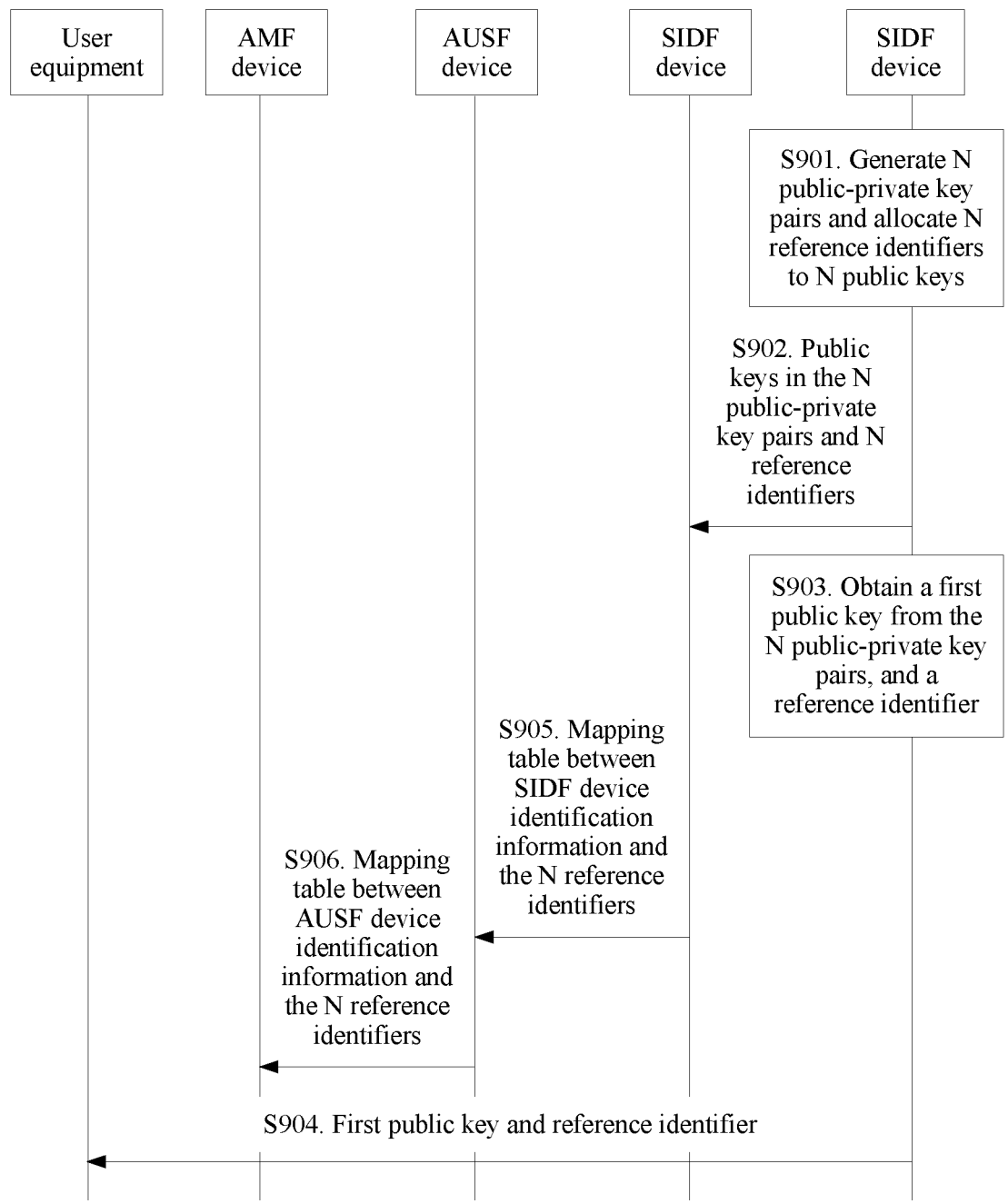
FIG. 9 is a sequence diagram 8 of a public key management method according to this application.

Based on the embodiments shown in FIG. 2A to FIG. 3B, when the user equipment sends the encrypted user identity information to the SIDF device for decryption, the SIDF device needs to prestore the N public-private key pairs and the N reference identifiers, obtains the first public key from the N public-private key pairs, obtains, from the N reference identifiers, the reference identifier used to index the first public key, and then delivers the first public key and a first index to the user equipment, that is, a public key generation and delivering process. This process may be specifically implemented by using three possible implementation methods in the following, as shown in FIG. 7 to FIG. 9.

Figure 7:
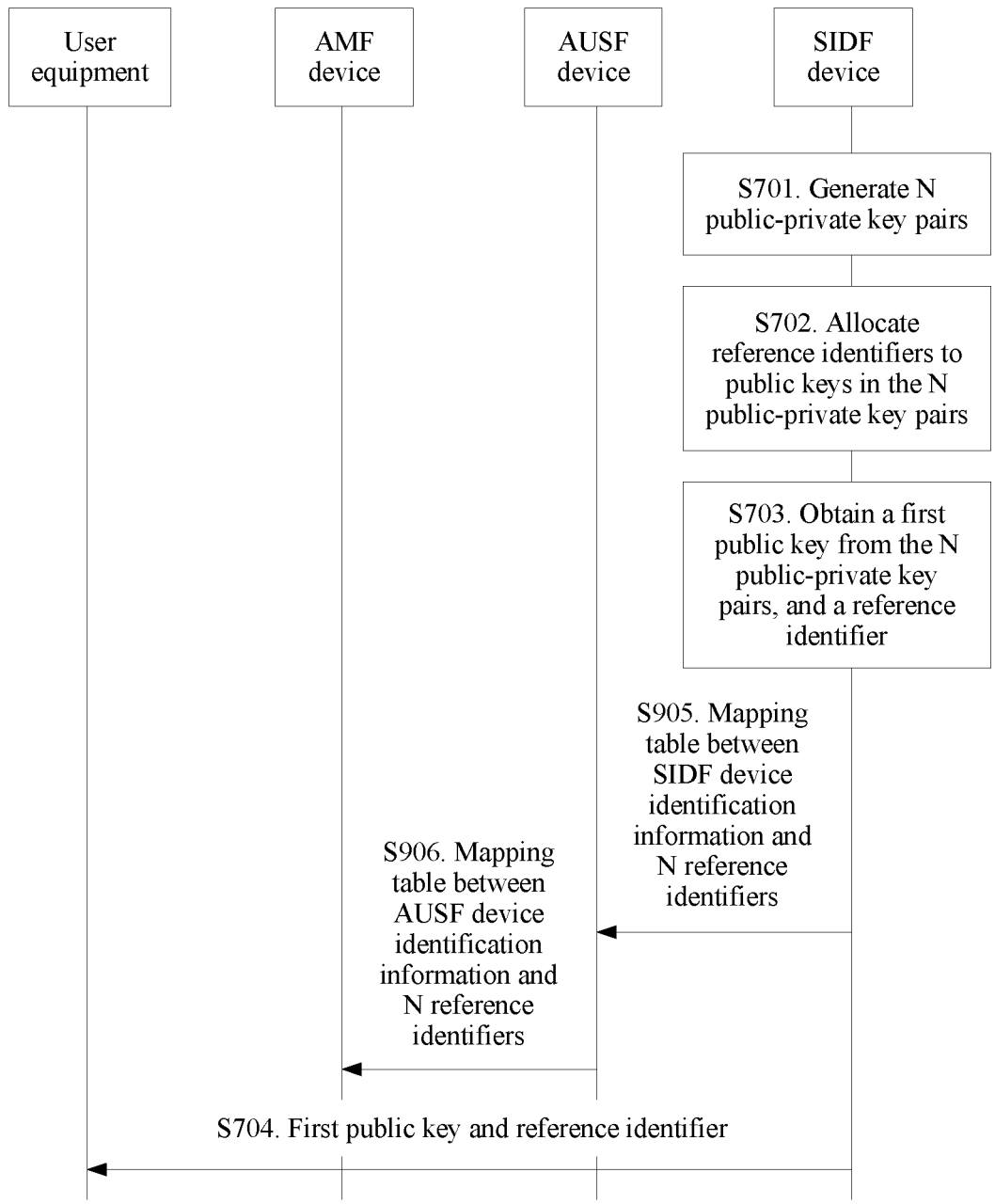
FIG. 7 is a sequence diagram 6 of a public key management method according to this application.

In a first possible implementation, FIG. 7 is a sequence diagram 6 of a public key management method according to this application. The public key management method may include the following steps.

S701. An SIDF device generates N public-private key pairs.

The first public-private key pair in the foregoing embodiments is any one of the N public-private key pairs, and N is an integer greater than 0. Each of the N public-private key pairs includes a public key and a corresponding private key. The public key may be used to encrypt the user identity information, and the private key may be used to decrypt the user identity information encrypted by using the public key.

S702. The SIDF device allocates reference identifiers to public keys in the N public-private key pairs.

It should be noted that a reference identifier used to index a public key may be a pre-allocated number, may be geographic information implying the identity management network device, or may be the public key. When an indication identifier indicates whether the user identity information is encrypted, when being a number greater than 0, the indication identifier may indicate that the user identity is in an encrypted state, or when being 0, the indication identifier indicates that the user identity information is in an unencrypted state.

The SIDF device allocates a reference identifier to each public key in the N public-private key pairs. Correspondingly, there are N reference identifiers, and the N reference identifiers are used to one-to-one correspondingly index the N public-private key pairs.

To avoid that a private key from a public-private key pair in a plurality of public-private key pairs cannot be determined to decrypt the encrypted user identity information, in this embodiment of this application, a reference identifier used to index a public key is allocated to the public key in each of the N public-private key pairs, so that when receiving the user identity information and the reference identifier, the SIDF device can determine, according to a pre-stored mapping table between public-private key pairs and reference identifiers, a first private key corresponding to a first public key, to decrypt the user identity information by using the first private key, thereby improving data decryption efficiency.

S703. The SIDF device obtains the first public key from the N public-private key pairs and a reference identifier from the N reference identifiers.

The reference identifier is used to index the first public key.

S704. The SIDF device sends the first public key and the reference identifier to user equipment.

For example, the SIDF device may send the first public key and the reference identifier to a trusted storage environment on the user equipment in an offline or online (OTP) manner. It should be noted that when the reference identifier is the first public key, the SIDF device may send only the first public key to the user equipment.

Optionally, the SIDF device may further send an encryption protocol supported by the first public key to the user equipment, so that the user equipment encrypts the user equipment information according to the encryption protocol based on the first public key.

In addition, when sending, to the user equipment, the first public key and the reference identifier used to index the first public key, the SIDF device may also send a use period of the first public key to the user equipment, so that the user equipment can determine, based on the use period of the first public key, whether the first public key is in the validity period. For example, the use period may be represented by a production date and an expiration date of the first public key, or may be represented by a production date and a useful period of the first public key.

It can be learned that in this embodiment of this application, after generating the N public-private key pairs and allocating, to a public key in each of the N public-private key pairs, a reference identifier used to index the public key, the SIDF device obtains the first public key from the N public-private key pairs and the reference identifier from the N reference identifiers, and sends the first public key and the reference identifier to the user equipment, so that the user equipment can encrypt the user identity information based on the first public key, and send, to the SIDF device by using an AMF device and an AUSF device, a third user identity message including the user identity information and the reference identifier. When receiving the third user identity message, the SIDF device can determine, based on the pre-stored mapping table between public-private key pairs and reference identifiers, the first private key corresponding to the first public key, to decrypt the user identity information by using the first private key, thereby improving the data decryption efficiency.

In a second possible implementation, FIG. 8 is a sequence diagram 7 of a public key management method according to this application. The public key management method may include the following steps.

S801. An SIDF device generates N public-private key pairs.

The first public-private key pair in the foregoing embodiments is any one of the N public-private key pairs, and N is an integer greater than 0.

S802. The SIDF device sends a reference identifier request message to a public key management function device.

The reference identifier request message includes public keys in the N public-private key pairs, and the reference identifier request message is used to request the public key management function device to allocate reference identifiers to the public keys in the N public-private key pairs.

After generating the N public-private key pairs, the SIDF device sends the reference identifier request message to the public key management function device, so that the public key management function device allocates the reference identifiers to the public keys in the N public-private key pairs.

S803. The public key management function device allocates N reference identifiers to N public keys.

The N reference identifiers are used to one-to-one correspondingly index the N public keys. It should be noted that a reference identifier used to index a public key may be a pre-allocated number, may be geographic information implying the identity management network device, or may be the public key. When an indication identifier indicates whether user identity information is encrypted, when being a number greater than 0, the indication identifier may indicate that the user identity is in an encrypted state, or when being 0, the indication identifier indicates that the user identity information is in an unencrypted state.

S804. The public key management function device sends the N public keys and the N reference identifiers to the SIDF device.

After allocating the N reference identifiers to the N public keys, the public key management function device sends the N public keys and the N reference identifiers to the SIDF device, so that the SIDF device obtains the N public keys and the N reference identifiers, and stores a mapping table between the N public-private key pairs and the N reference identifiers. Therefore, after receiving a first user identity message, the SIDF device finds a corresponding first private key based on a reference identifier that is used to index a first public key and that is included in the first user identity message, to decrypt the encrypted user identity information by using the first private key.

S805. The public key management function device obtains the first public key from the N public keys and obtains, from the N reference identifiers, the reference identifier used to index the first public key.

S806. The public key management function device sends the first public key and the reference identifier to user equipment.

For example, the public key management function device may send the first public key and the reference identifier to a trusted storage environment on the user equipment in an offline or online (OTP) manner. It should be noted that when the reference identifier is the first public key, the SIDF device may send only the first public key to the user equipment.

Optionally, the public key management function device may further send an encryption protocol supported by the first public key to the user equipment, so that the user equipment encrypts the user equipment information according to the encryption protocol based on the first public key.

After allocating the N reference identifiers to the N public keys, the public key management function device may obtain the first public key from the N public keys, and obtain, from the N reference identifiers, the reference identifier used to index the first public key; and send the first public key and the reference identifier to the user equipment, so that when determining to encrypt the user identity information, the user equipment can encrypt the user identity information based on the first public key, and indicate, by using the reference identifier, the first public key used to encrypt the user identity information.

It should be noted that in this embodiment of this application, there is no sequence between S804 and S805.

It can be learned that in this embodiment of this application, the SIDF device generates the N public-private key pairs and sends the reference identifier request message to the public key management function device, so that the public key management function device allocates the reference identifiers to the public keys in the N public-private key pairs. After allocating the N reference identifiers to the N public keys, the public key management function device may obtain the first public key from the N public keys and obtain, from the N reference identifiers, the reference identifier used to index the first public key; and send the first public key and the reference identifier to the user equipment, so that when determining to encrypt the user identity information, the user equipment can encrypt the user identity information based on the first public key. In addition, the public key management function device sends the N public keys and the N reference identifiers to the SIDF device, so that the SIDF device obtains the N public keys and the N reference identifiers, and stores the mapping table between the N public-private key pairs and the N reference identifiers. Therefore, after receiving a third user identity message, the SIDF device finds the corresponding first private key based on the reference identifier that is used to index the first public key and that is included in the third user identity message, to decrypt the encrypted user identity information by using the first private key, thereby improving data decryption efficiency.

In a third possible implementation, FIG. 9 is a sequence diagram 8 of a public key management method according to this application. The public key management method may include the following steps.

S901. A public key management function device generates N public-private key pairs and allocates N reference identifiers to N public keys.

Each public-private key pair includes a public key and a private key, and the N public keys are public keys in the N public-private key pairs. The first public-private key pair in the foregoing embodiments is any one of the N public-private key pairs, and N is an integer greater than 0. The N reference identifiers are used to one-to-one correspondingly index the N public keys. It can be understood that the reference identifiers may be character strings, numbers, or the like. For example, if there are 100 public-private key pairs, identifiers allocated to public keys may be 0 to 99. Certainly, a length of a reference identifier may be alternatively limited, for example, a length is 6 bits, 8 bits, 15 bits, or 100 bits, and may be certainly determined based on a service scale.

S902. The public key management function device sends the public keys in the N public-private key pairs and the N reference identifiers to an SIDF device.

It should be noted that a reference identifier used to index a public key may be a pre-allocated number, may be geographic information implying the identity management network device, or may be the public key.

For example, when being a number greater than 0, an indication identifier may indicate that a user identity is in an encrypted state, and when being 0, the indication identifier indicates that user identity information is in an unencrypted state. For example, the indication identifier is 1, indicating that the user identity is in the encrypted state. The indication identifier is 0, indicating that the user identity information is in the unencrypted state.

For example, the indication identifier may be a preset character string. For example, a first preset character string indicates that the user identity is in the encrypted state, and a second preset character string indicates that the user identity is in the unencrypted state. It can be understood that the first preset character string is different from the second preset character string, and a format of a character string is not limited herein in the present invention.

After allocating the N reference identifiers to the N public keys, the public key management function device sends the N public keys and the N reference identifiers to the SIDF device, so that the SIDF device obtains the N public keys and the N reference identifiers, and stores a mapping table between the N public-private key pairs and the N reference identifiers. Therefore, after receiving a first user identity message, the SIDF device finds a corresponding first private key based on a reference identifier that is used to index a first public key and that is included in the first user identity message, to decrypt the encrypted user identity information by using the first private key.

S903. The public key management function device obtains the first public key from the N public keys and obtains, from the N reference identifiers, the reference identifier used to index the first public key.

S904. The public key management function device sends the first public key and the reference identifier to user equipment.

For example, the public key management function device may send the first public key and the reference identifier to a trusted storage environment on the user equipment in an offline or online (OTP) manner. It should be noted that when the reference identifier is the first public key, the SIDF device may send the first public key to the user equipment.

Optionally, the public key management function device may further send an encryption protocol supported by the first public key to the user equipment, so that the user equipment encrypts the user equipment information according to the encryption protocol based on the first public key.

After allocating the N reference identifiers to the N public keys, the public key management function device may obtain the first public key from the N public keys, and obtain, from the N reference identifiers, the reference identifier used to index the first public key; and send the first public key and the reference identifier to the user equipment, so that when determining to encrypt the user identity information, the user equipment can encrypt the user identity information based on the first public key, and indicate, by using the reference identifier, the first public key used to encrypt the user identity information.

It should be noted that in this embodiment of this application, there is no sequence between S902 and S903.

It can be learned that in this embodiment of this application, the public key management function device generates the N public-private key pairs and allocates the N reference identifiers to the N public keys. After allocating the N reference identifiers to the N public keys, the public key management function device may obtain the first public key from the N public keys and obtain, from the N reference identifiers, the reference identifier used to index the first public key; and send the first public key and the reference identifier to the user equipment, so that when determining to encrypt the user identity information, the user equipment can encrypt the user identity information based on the first public key. In addition, the public key management function device sends the public keys in the N public-private key pairs and the N reference identifiers to the SIDF device, so that the SIDF device obtains the public keys in the N public-private key pairs and the N reference identifiers, and stores the mapping table between the N public-private key pairs and the N reference identifiers. Therefore, after receiving a third user identity message, the SIDF device finds the corresponding first private key based on the reference identifier that is used to index the first public key and that is included in the third user identity message, to decrypt the encrypted user identity information by using the first private key, thereby improving data decryption efficiency.

Based on the embodiments shown in any accompanying drawing in FIG. 7 to FIG. 9, after the SIDF device or the public key management function device obtains the first public key from the N public-private key pairs and the reference identifier, to enable the AUSF device to find the SIDF device of the first private key used for decryption, and to enable the AMF device to find the AUSF device corresponding to the first public key in a subsequent decryption process (the embodiment shown in FIG. 2A and FIG. 2B), S905 and S906 may be performed.

S905. The SIDF device sends a mapping table between SIDF device identification information and the N reference identifiers to the AUSF device.

The SIDF device identification information may be geographic information of the SIDF device, or may be name information of the SIDF device, provided that the SIDF device can be found based on the SIDF device identification information.

The SIDF device sends the mapping table between the SIDF device identification information and the N reference identifiers to the AUSF device, so that the AUSF device obtains and stores the mapping table between the SIDF device identification information and the N reference identifiers. Therefore, after receiving second user identity information of the user equipment, the AUSF device sends the second user identity information of the user equipment to the SIDF device based on the pre-stored mapping table between the SIDF device identification information and the N reference identifiers, so that the SIDF device decrypts the encrypted user identity information.

It should be noted that when a communications system includes one SIDF device, the SIDF device needs to send only the N reference identifiers to the AUSF device, and does not need to send the SIDF device identification information. Alternatively, when the reference identifier is the geographic information of the SIDF device and the AUSF device, the SIDF device needs to send only the N reference identifiers to the AUSF device, and does not need to send the SIDF device identification information. The AUSF device can find the SIDF device based on the geographic information of the SIDF device.

S906. The AUSF device sends a mapping table between AUSF device identification information and the N reference identifiers to the AMF device.

The AUSF device identification information may be geographic information of the AUSF device, or may be name information of the AUSF device, provided that the AUSF device can be found based on the AUSF device identification information.

The AUSF device sends the mapping table between the AUSF device identification information and the N reference identifiers to the AMF device, so that the AMF device obtains and stores the mapping table between the AUSF device identification information and the N reference identifiers. Therefore, after receiving a first user identity message sent by the user equipment, the AMF device sends the first user identity information of the user equipment to the AUSF device based on the pre-stored mapping table between the AUSF device identification information and the N reference identifiers.

It should be noted that when a communications system includes one AUSF device, the AUSF device needs to send only the N reference identifiers to the AMF device, and does not need to send the AUSF device identification information. Alternatively, when the reference identifier is the geographic information of the AUSF device and the AUSF device, the AUSF device needs to send only the N reference identifiers to the AMF device, and does not need to send the AUSF device identification information. The AMF device can find the AUSF device based on the geographic information of the AUSF device.

It should be noted that in the embodiment shown in FIG. 7, there is no sequence between S704, and S905 and S906. The embodiment shown in FIG. 7 provides description merely by using an example in which S905 and S906 are first performed, and then S704 is performed. Similarly, in the embodiment shown in FIG. 8, there is no sequence between S806, and S905 and S906. The embodiment shown in FIG. 8 provides description merely by using an example in which S905 and S906 are first performed, and then S806 is performed. Similarly, in the embodiment shown in FIG. 9, there is no sequence between S904, and S905 and S906. The embodiment shown in FIG. 9 provides description merely by using an example in which S905 and S906 are first performed, and then S904 is performed.

According to the public key management method provided in this embodiment of this application, the mapping table between the SIDF device identification information and the N reference identifiers is sent to the AUSF device, and the AUSF device sends the mapping table between the AUSF device identification information and the N reference identifiers to the AMF device, so that after the user equipment encrypts the user identity information based on the first public key and sends the first user identity message to the AMF device, the AMF device can send the first user identity information of the user equipment to the AUSF device based on the pre-stored mapping table between the AUSF device identification information and the N reference identifiers. Therefore, the AUSF device can send the second user identity information of the user equipment to the SIDF device based on the pre-stored mapping table between the SIDF device identification information and the N reference identifiers, and the SIDF device decrypts the encrypted user identity information, thereby improving the data decryption efficiency.

Figure 10:
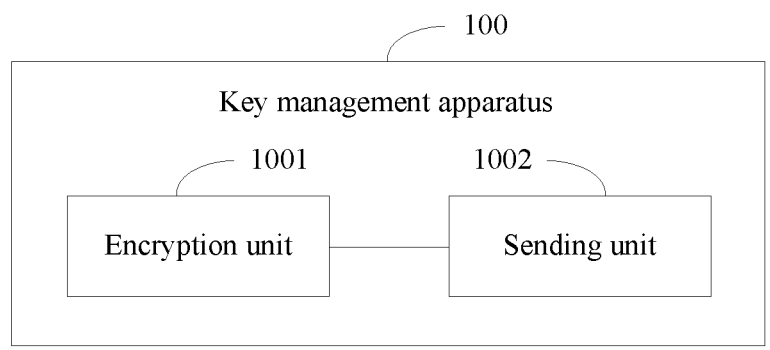
FIG. 10 is a schematic diagram 1 of a public key management apparatus according to this application.

FIG. 10 is a schematic diagram 1 of a public key management apparatus 100 according to this application. The public key management apparatus 100 may include: an encryption unit 1001, configured to encrypt user identity information based on a first public key; and a sending unit 1002, configured to send a first user identity message to a first network device, where the first user identity message includes the user identity information, an indication identifier used to indicate whether the user identity information is encrypted, and a reference identifier used to index the first public key, so that the first network device processes the first user identity message based on the indication identifier and the reference identifier.

Optionally, the encryption unit 1001 is further configured to determine whether to encrypt the user identity information; and the sending unit 1002 is further configured to: when it is determined that the user identity information is not to be encrypted, send, by the user equipment, a second user identity message to the first network device, where the second user identity message includes the unencrypted user identity information and the indication identifier.

Figure 11:
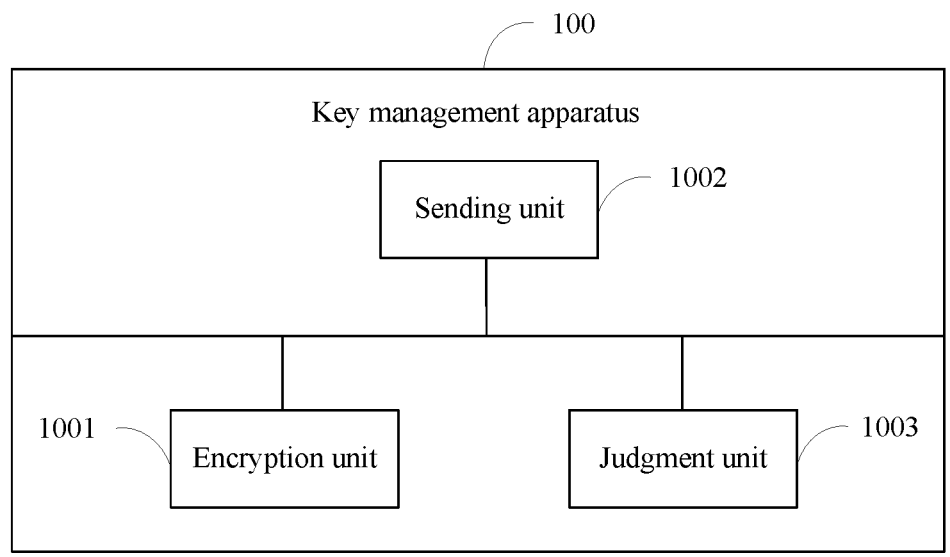
FIG. 11 is a schematic diagram 2 of a public key management apparatus according to this application.

Optionally, the public key management apparatus 100 may further include a judgment unit 1003. FIG. 11 is a schematic diagram 2 of the public key management apparatus 100 according to this application.

The judgment unit 1003 is configured to determine whether the first public key is in a validity period.

The encryption unit 1001 is specifically configured to: when the first public key is in the validity period, encrypt the user identity information based on the first public key.

The key management method and specific examples of the key management apparatus in the embodiments shown in FIG. 2A to FIG. 9 are also applicable to the key management apparatus in this embodiment. From the detailed descriptions about the key management method, a person skilled in the art may clearly know an implementation method of the key management apparatus in this embodiment. Therefore, for brevity of the specification, details are not described again herein.

Figure 12:
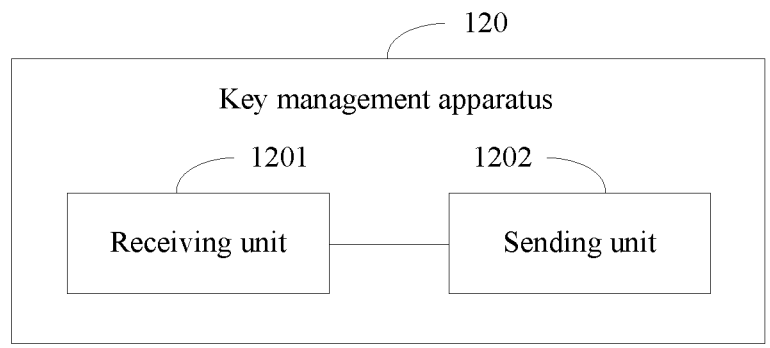
FIG. 12 is a schematic diagram 3 of a public key management apparatus according to this application.

FIG. 12 is a schematic diagram 3 of a public key management apparatus 120 according to this application. The public key management apparatus 120 may include: a receiving unit 1201, configured to receive a first user identity message sent by user equipment, where the first user identity message includes user identity information, an indication identifier used to indicate whether the user identity information is encrypted, and a reference identifier used to index a first public key; and a sending unit 1202, configured to: if the indication identifier indicates that the user identity information is in an encrypted state, send a third user identity message to a second network device based on the reference identifier, where the third user identity message includes the user identity information and the reference identifier, so that the second network device processes the user identity information based on the reference identifier.

Optionally, the sending unit 1202 is specifically configured to send the first user identity message to a third network device based on the reference identifier, so that the third network device sends the third user identity message to the second network device when the indication identifier indicates that the user identity information is in the encrypted state.

Optionally, the sending unit 1202 is specifically configured to determine, based on the reference identifier, identification information of the second network device corresponding to the first public key, and send the third user identity message to the second network device based on the identification information of the second network device.

Figure 13:
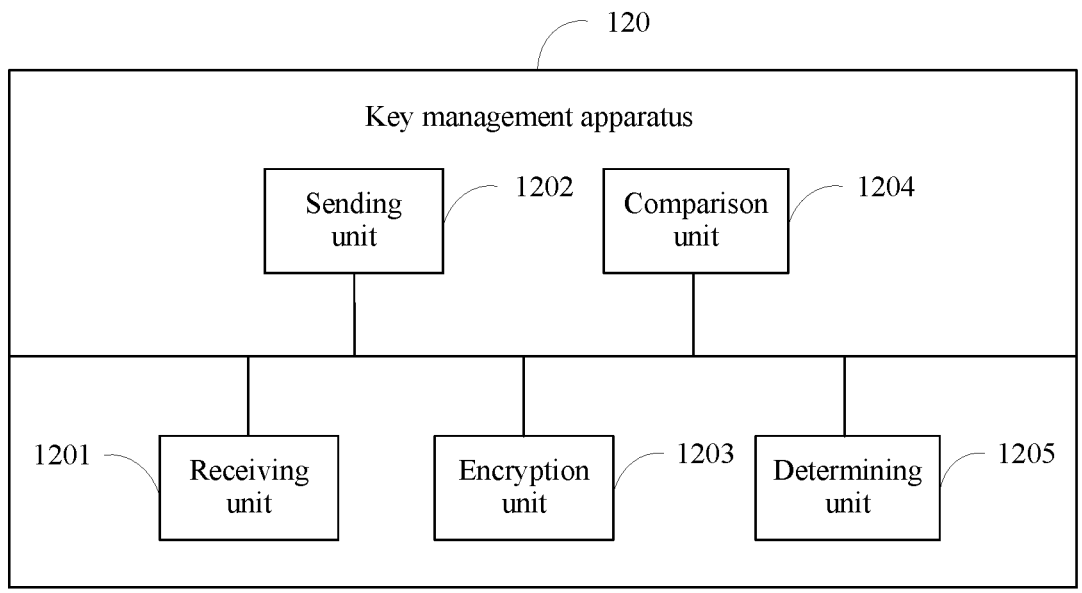
FIG. 13 is a schematic diagram 4 of a public key management apparatus according to this application.

Optionally, the key management apparatus 120 may further include an encryption unit 1203 and a comparison unit 1204. FIG. 13 is a schematic diagram 4 of the public key management apparatus 120 according to this application. The public key management apparatus 120 may include the receiving unit 1201, the encryption unit 1203, the comparison unit 1204, and the sending unit 1202.

The receiving unit 1201 is further configured to receive a fourth identity message sent by the second network device, where the fourth user identity message includes the decrypted user identity information and the first public key.

The encryption unit 1203 is configured to encrypt the decrypted user identity information by using the first public key, to generate user identity information that needs to be verified.

The comparison unit 1204 is configured to compare the user identity information that needs to be verified and the user identity information.

The sending unit 1202 is further configured to: if the user identity information that needs to be verified is the same as the user identity information, send instruction information to the third network device, where the instruction message includes the decrypted user identity information, and the instruction information is used to instruct the third network device to process the decrypted user identity information.

Optionally, the receiving unit 1201 is specifically configured to receive the fourth user identity message forwarded by the third network device.

Optionally, the key management apparatus 120 may further include a determining unit 1205.

The receiving unit 1201 is further configured to receive a mapping table that is between identification information of the second network device and N reference identifiers and that is sent by the second network device, where the N reference identifiers are used to one-to-one correspondingly index N public keys, the first public key is any one of the N public keys, and N is an integer greater than 0.

That the determining unit 1205 is configured to determine, based on the reference identifier, the identification information of the second network device corresponding to the first public key includes: the determining unit 1205 is further configured to determine, according to the mapping table between the identification information of the second network device and the N reference identifiers, the identification information of the second network device corresponding to the first public key.

The key management method and specific examples of the key management apparatus in the embodiments shown in FIG. 2A to FIG. 9 are also applicable to the key management apparatus in this embodiment. From the detailed descriptions about the key management method, a person skilled in the art may clearly know an implementation method of the key management apparatus in this embodiment. Therefore, for brevity of the specification, details are not described again herein.

Figure 14:
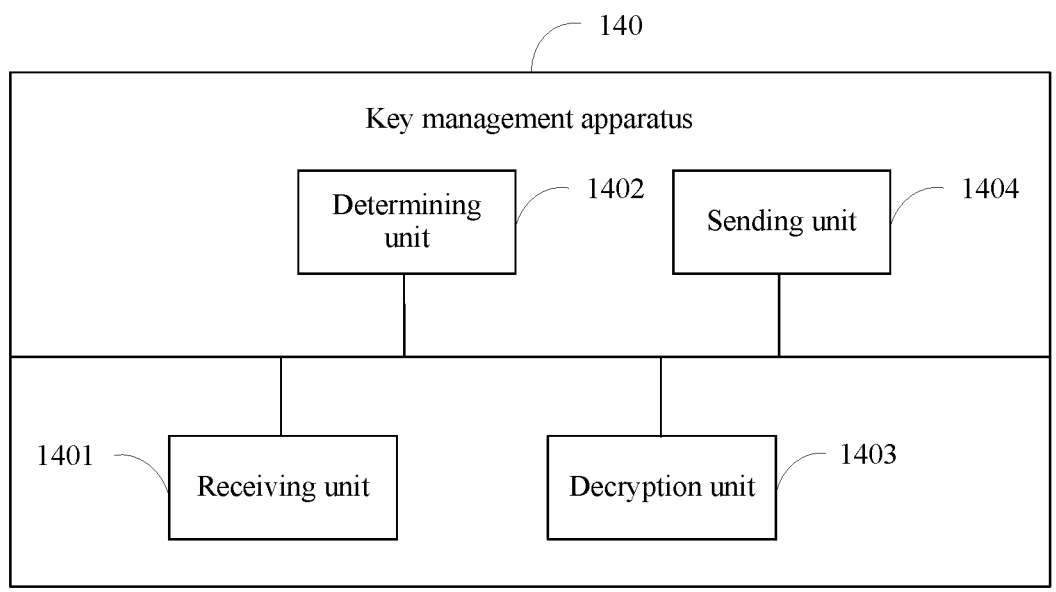
FIG. 14 is a schematic diagram 5 of a public key management apparatus according to this application.

FIG. 14 is a schematic diagram 5 of a public key management apparatus 140 according to this application. The public key management apparatus 140 may include: a receiving unit 1401, configured to receive a third user identity message sent by a first network device, where the third user identity message includes user identity information and a reference identifier used to index a first public key; a determining unit 1402, configured to determine, based on the reference identifier, a first private key corresponding to the first public key, where the first public key and the first private key are a first public-private key pair; a decryption unit 1403, configured to decrypt the user identity information based on the first private key, to obtain the decrypted user identity information; and a sending unit 1404, configured to send the decrypted user identity information to a third network device, so that the third network device processes the decrypted user identity information.

Optionally, the receiving unit 1401 is specifically configured to receive the third user identity message forwarded by the third network device.

Figure 15:
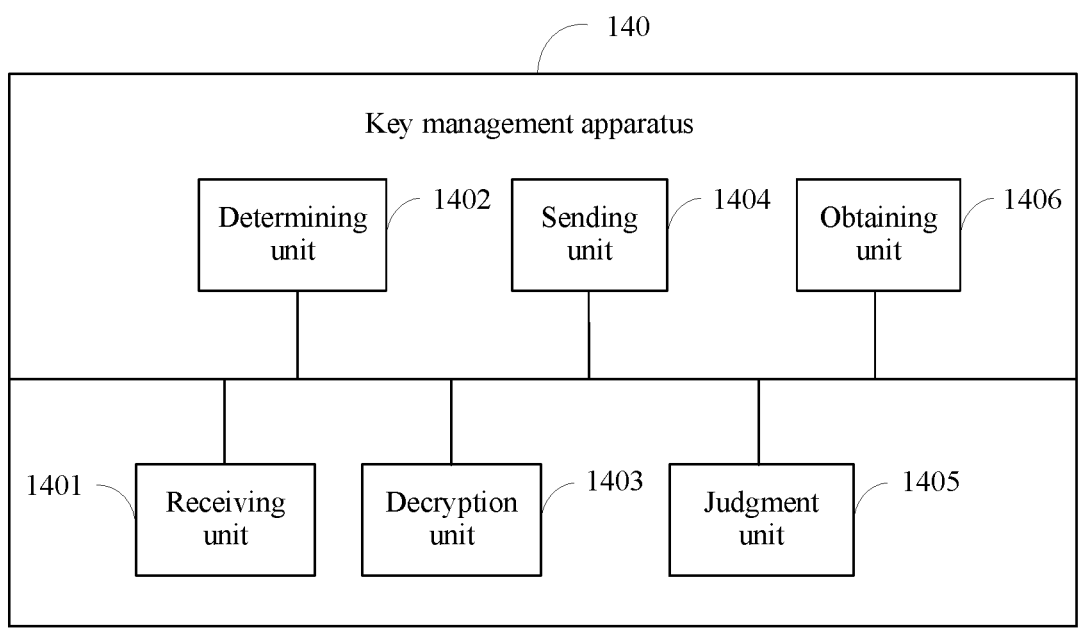
FIG. 15 is a schematic diagram 6 of a public key management apparatus according to this application.

Optionally, the key management apparatus 140 may further include a judgment unit 1405. FIG. 15 is a schematic diagram 6 of the public key management apparatus 140 according to this application.

The judgment unit 1405 is configured to determine whether the first public key is in a validity period, where the determining unit 1402 is specifically configured to: when the first public key is in the validity period, determine, based on the reference identifier, the first private key corresponding to the first public key.

Optionally, the key management apparatus 140 may further include: an obtaining unit 1406, configured to obtain N public-private key pairs and N reference identifiers, where the N reference identifiers are used to one-to-one correspondingly index the N public-private key pairs, the first public-private key pair is any one of the N public-private key pairs, and N is an integer greater than 0.

Optionally, the obtaining unit 1406 is specifically configured to generate the N public-private key pairs and allocate reference identifiers to public keys in the N public-private key pairs.

Optionally, the obtaining unit 1406 is specifically configured to generate the N public-private key pairs; and the sending unit 1404 is further configured to send a reference identifier request message to a fourth network device, where the reference identifier request message includes public keys in the N public-private key pairs, and the reference identifier request message is used to request the fourth network device to allocate reference identifiers to the public keys in the N public-private key pairs; and the receiving unit 1401 is further configured to receive the public keys in the N public-private key pairs and the N reference identifiers that are sent by the fourth network device.

Optionally, the receiving unit 1401 is further configured to receive the N public-private key pairs and the N reference identifiers that are sent by a fourth network device.

Optionally, the obtaining unit 1406 is further configured to obtain the first public key from the N public-private key pairs and obtain the reference identifier from the N reference identifiers; and the sending unit 1404 is further configured to send the first public key and the reference identifier to user equipment.

Optionally, the sending unit 1404 is further configured to send a fourth user identity message to the first network device, where the fourth user identity message includes the decrypted user identity information and the first public key, so that the first network device processes the fourth user identity message based on the first public key.

Optionally, the sending unit 1404 is further configured to forward the fourth user identity message to the first network device by using the third network device.

Optionally, the sending unit 1404 is further configured to send a public key update request message to the user equipment when the first public key is not in the validity period, where the public key update request message is used to instruct the user equipment to update the first public key.

Optionally, the receiving unit 1404 is further configured to send a mapping table between identification information of the second network device and N reference identifiers to the first network device, where the N reference identifiers are used to one-to-one correspondingly index N public keys, the first public key is any one of the N public keys, and N is an integer greater than 0; and the receiving unit 1401 is specifically configured to receive the third user identity message sent by the first network device according to the mapping table between the identification information of the second network device and the N reference identifiers.

The key management method and specific examples of the key management apparatus in the embodiments shown in FIG. 2A to FIG. 9 are also applicable to the key management apparatus in this embodiment. From the detailed descriptions about the key management method, a person skilled in the art may clearly know an implementation method of the key management apparatus in this embodiment. Therefore, for brevity of the specification, details are not described again herein.

Figure 16:
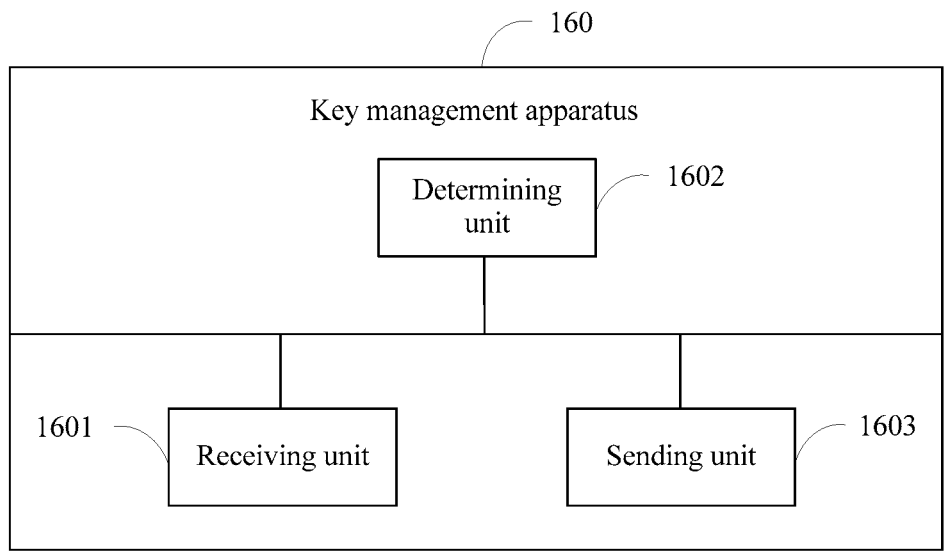
FIG. 16 is a schematic diagram 7 of a public key management apparatus according to this application.

FIG. 16 is a schematic diagram 7 of a public key management apparatus 160 according to this application. The public key management apparatus 160 may include: a receiving unit 1601, configured to receive a first user identity message sent by a first network device, where the first user identity message includes user identity information, an indication identifier used to indicate whether the user identity information is encrypted, and a reference identifier used to index a first public key; a determining unit 1602, configured to: if the indication identifier indicates that the user identity information is in an encrypted state, determine, based on the reference identifier, identification information of a second network device corresponding to the reference identifier; and a sending unit 1603, configured to send a third user identity message to the second network device based on the identification information of the second network device, where the third user identity message includes the user identity information and the reference identifier that is used to index the first public key, so that the second network device processes the third user identity message based on the reference identifier.

Optionally, the receiving unit 1601 is further configured to receive a fourth user identity message sent by the second network device, where the fourth user identity message includes the decrypted user identity information and the first public key; and the sending unit 1603 is further configured to send the fourth user identity message to the first network device, so that the first network device processes the fourth user identity message based on the first public key.

Optionally, the receiving unit 1601 is further configured to receive instruction information sent by the first network device, where the instruction message includes the decrypted user identity information, and the instruction information is used to instruct the third network device to process the decrypted user identity information.

Optionally, the receiving unit 1601 is further configured to receive a mapping table that is between identification information of the second network device and N reference identifiers and that is sent by the second network device, where the N reference identifiers are used to one-to-one correspondingly index N public keys, the first public key is any one of the N public keys, and N is an integer greater than 0; and the determining unit 1602 is specifically configured to determine, according to the mapping table between the identification information of the second network device and the N reference identifiers, the identification information of the second network device corresponding to the reference identifier.

Optionally, the sending unit 1603 is further configured to send a mapping table between identification information of the third network device and the N reference identifiers to the first network device; and the receiving unit 1601 is specifically configured to receive the first user identity message of user equipment forwarded by the first network device according to the mapping table between the identification information of the third network device and the N reference identifiers.

The key management method and specific examples of the key management apparatus in the embodiments shown in FIG. 2A to FIG. 9 are also applicable to the key management apparatus in this embodiment. From the detailed descriptions about the key management method, a person skilled in the art may clearly know an implementation method of the key management apparatus in this embodiment. Therefore, for brevity of the specification, details are not described again herein.

Figure 17:
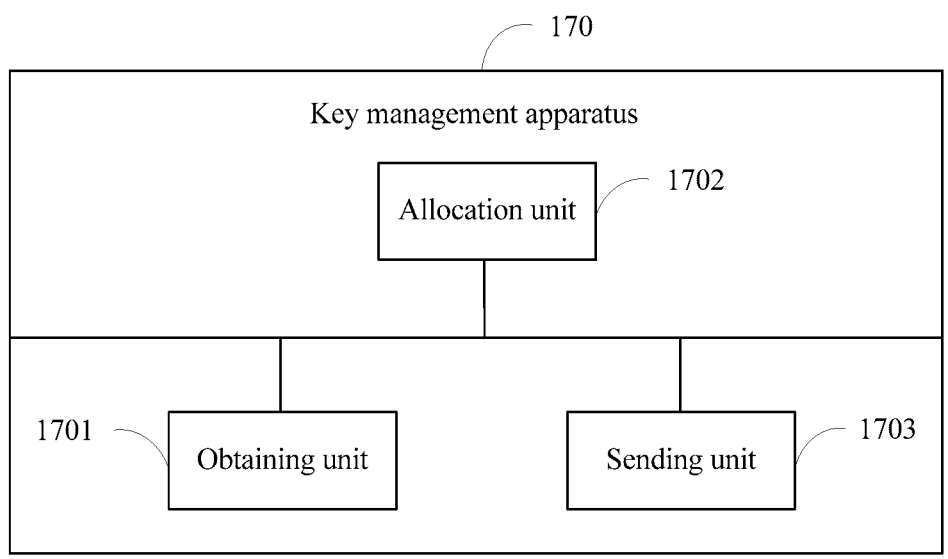
FIG. 17 is a schematic diagram 8 of a public key management apparatus according to this application.

FIG. 17 is a schematic diagram 8 of a public key management apparatus 170 according to this application. The public key management apparatus 170 may include: an obtaining unit 1701, configured to obtain N public keys, where N is an integer greater than 0; an allocation unit 1702, configured to allocate N reference identifiers to the N public keys, where the N reference identifiers are used to one-to-one correspondingly index the N public keys; and a sending unit 1703, configured to send the N public keys and the N reference identifiers to a second network device, so that the second network device obtains the N public keys and the N reference identifiers.

Optionally, the obtaining unit 1701 is specifically configured to generate N public-private key pairs, where each public-private key pair includes a public key and a private key, and the N public keys are public keys in the N public-private key pairs; and the sending unit 1703 is further configured to send the N public-private key pairs and the N reference identifiers to the second network device.

Optionally, the receiving unit is further configured to receive a reference identifier request message sent by the second network device, where the reference identifier request message includes the public keys in the N public-private key pairs, and the reference identifier request message is used to request the fourth network device to allocate reference identifiers to the public keys in the N public-private key pairs.

Optionally, the obtaining unit 1701 is further configured to obtain a first public key from the N public keys, and obtain, from the N reference identifiers, a reference identifier used to index the first key; and the sending unit 1703 is further configured to send the first public key and the reference identifier to user equipment.

The key management method and specific examples of the key management apparatus in the embodiments shown in FIG. 2A to FIG. 9 are also applicable to the key management apparatus in this embodiment. From the detailed descriptions about the key management method, a person skilled in the art may clearly know an implementation method of the key management apparatus in this embodiment. Therefore, for brevity of the specification, details are not described again herein.

Figure 18:
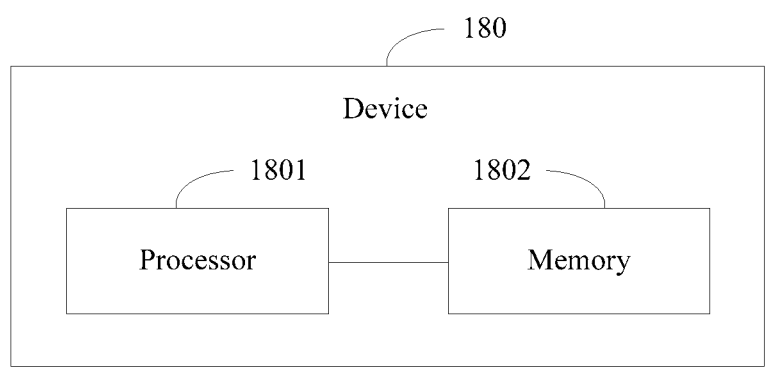
FIG. 18 is a block diagram of a device according to this application.

FIG. 18 is a block diagram of a device 180 according to this application. Referring to FIG. 18, the device 180 includes a processor 1801 and a memory 1802.

The memory 1802 is configured to store an instruction, and the processor 1801 is configured to execute the instruction stored in the memory 1802. When the processor 1801 executes the instruction stored in the memory 1802, the device 180 performs the method according to any embodiment in FIG. 2A to FIG. 9.

It should be understood that the processor 1801 may be a central processing unit (CPU), or may be another general purpose processor 1801, a digital signal processor 1801 (DSP), an application-specific integrated circuit (ASIC), or the like. The general purpose processor 1801 may be a microprocessor 1801, or the processor 1801 may be any conventional processor 1801 or the like. The steps of the methods disclosed with reference to this application may be directly implemented by a hardware processor 1801, or may be implemented by a combination of hardware and a software module in the processor 1801.

All or some steps of the foregoing method embodiments may be implemented by using hardware related to a program instruction. The foregoing program may be stored in a computer-readable memory 1802. When the program is executed, the steps of the methods in the embodiments are performed. The memory 1802 (storage medium) includes: a read-only memory 1802 (ROM), a RAM, a flash memory 1802, a hard disk, a solid state disk, a magnetic tape, a floppy disk, an optical disc, and any combination thereof.

This application further provides a readable storage medium, and the readable storage medium stores an instruction.

When at least one processor of user equipment executes the instruction, the user equipment performs the key management method provided in the method embodiments in FIG. 2A to FIG. 9.

This application further provides a readable storage medium, and the readable storage medium stores an instruction. When at least one processor of a network device performs the instruction, the network device performs the key management method provided in the method embodiments in FIG. 2A to FIG. 9.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A key management method carried out by a user equipment (UE), the method comprises:
    determining whether to encrypt an unencrypted user identity information; and
    performing, based on the determining, one of the group consisting of:
        obtaining, in accordance with a determining to encrypt the user identity information, an encrypted user identity information by:
            encrypting the unencrypted user identity information based on a first public key; and
        sending a first user identity information to an access and management function (AMF) device, wherein the first user identity information comprises the encrypted user identity information, a first indication identifier, and a reference identifier, wherein the first indication identifier is a non-zero value to indicate that the user identity information is in an encrypted state, and wherein the reference identifier is a non-zero value to index the first public key; and
        sending, in accordance with a determining not to encrypt the user identity information, a second user identity message to the AMF device, wherein the second user identity message comprises the unencrypted user identity information, a second indication identifier, and a public key identifier, wherein a value of the second indication identifier is 0 to indicate that the user identity information is in an unencrypted state, and a value of the public key identifier is 0.

2. The method according to claim 1, wherein before the encrypting the unencrypted user identity information based on a first public key, the method further comprises:
    determining, by the user equipment, whether the first public key is in a validity period; and
    the encrypting, by user equipment, user identity information based on a first public key comprises:
        when the first public key is in the validity period, encrypting, by the user equipment, the user identity information based on the first public key.

3. The method according to claim 1, wherein the public key is null when the value of the public key identifier is 0.

4. A key management apparatus, wherein the apparatus comprises:
    a processor; and
    a non-transitory computer-readable medium including computer-executable instructions that, when executed by the processor, facilitate the key management apparatus carrying out a method comprising:
    determining whether to encrypt an unencrypted user identity information; and
    performing, based on the determining, one of the group consisting of:
        obtaining, in accordance with a determining to encrypt the user identity information, an encrypted user identity information by:
            encrypting the unencrypted user identity information based on a first public key; and
            sending a first user identity information to an access and management function (AMF) device, wherein the first user identity information comprises the encrypted user identity information, a first indication identifier, and a reference identifier, wherein the first indication identifier is a non-zero value to indicate that the user identity information is in an encrypted state, and wherein the reference identifier is a non-zero value to index the first public key; and
        sending, in accordance with a determining not to encrypt the user identity information, a second user identity message to the AMF device, wherein the second user identity message comprises the unencrypted user identity information, a second indication identifier, and a public key identifier, wherein a value of the second indication identifier is 0 to indicate that the user identity information is in an unencrypted state, and a value of the public key identifier is 0.

5. The apparatus according to claim 4, wherein when executed by the processor, facilitate the key management apparatus carrying out the method further comprising:
    determining whether the first public key is in a validity period; and
    when the first public key is in the validity period, encrypting, by the user equipment, the user identity information based on the first public key.

6. The apparatus according to claim 4, wherein the public key is null when the value of the public key identifier is 0.

* * * * *